United States Patent Office 3,424,747
Patented Jan. 28, 1969

3,424,747
AMINO-STEROL COMPOUNDS AND PRODUCTION THEREOF
Josef Schmitt, L'Hay-les-Roses, and Jacques J. Panouse, Paris, France, assignors to Etablissements Clin-Byla, Paris, France, a company of France
No Drawing. Filed Sept. 9, 1960, Ser. No. 54,858
Claims priority, application France, Sept. 12, 1959, 805,106
U.S. Cl. 260—239.5    17 Claims
Int. Cl. C07c 173/10, 169/50; A61k 17/00

The present invention relates to a process for preparing sterol compounds among which are new sterol compounds.

The main object of the invention is to enrich the therapeutic armamentarium with compounds having a selective action on the central nervous system and which are particularly valuable as neuroleptics and aggressiveness-inhibitors, but are of low toxicity.

A further object is to provide a convenient route to a whole class of sterol compounds which are, for the most part, new.

The invention relates to compounds having a primary, secondary or tertiary amino group (or functional derivative thereof such as an amine salt, a quaternary ammonium compound, an amide or an imine) in the 3-position of a steroid substituted inter alia at the 17-position either by an oxygen-containing group (hydroxyl, ester, ethereal oxygen) by a side-chain containing two carbon atoms and having at least one oxygen-containing functional group (hydroxyl, ketone, ester, ethereal oxygen or ketal) or by two such groups.

More particularly the compounds correspond to the following general formula:

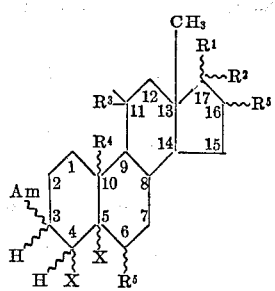

in which $R^1$ is a group having one of the general formulae
—$OR^6$ or $CR^7$—$CH_2R^8$, $R^6$ being a hydrogen atom, an alkyl or aralkyl group, or an acyl group derived from a carboxylic acid having a total of less than 6 carbon atoms, whilst $R^7$ is

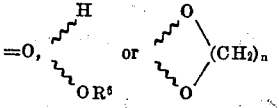

in which $n$ is 2 or 3; and $R^8$ is a hydrogen atom or —$OR^6$, including the case in which there is an oxygen bridge between the carbon atoms 20 and 21 which carry the groups $R^7$ and $R^8$; $R^2$ is a hydrogen atom or $OR^6$ and is a hydrogen atom when $R^1$ is —$OR^6$;

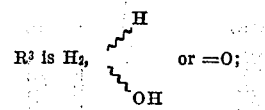

$R^4$ is a hydrogen atom or a methyl group;

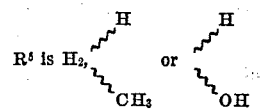

X represents either hydrogen atoms at positions 4 and 5, or otherwise there is a double bond at position 4, but in the latter case Am can be only a pyrrolidine group or an amine group of similar structure; Am is either (a) a primary amine group or an imine group of the general formula —N=CH—Ar in which Ar is a benzene ring which may be substituted; (b) a lower aliphatic, aralipathic or cycloaliphatic amino group, either unsubstituted or having various substituents, and may be a heterocyclic ring containing a nitrogen atom; (c) an amido group derived from a lower aliphatic acid and from a primary or secondary amine as defined under (a) or (b) above; (d) is an amino group as defined under (a) and (b) above in the form of a salt or ultimately converted into a quaternary ammonium compound, and comprising inter alia the compounds for which the above symbols have the meaning shown in Table 1 below. In that table and in the remainder of the description "tube" means that the uncorrected melting point has been determined using a capillary tube, "(K)" means that it was determined using a Kofler block, and "(micr.)" that it was determined using a microscope.

TABLE I

| Compound having Formula I | Position 17 ($R_1+R_2$) | | Position 11 $R^3$ | Position 10 $R^4(\beta)$ | Positions 6 and 16 $R^5$ | Position 3 | | Position 5 X | Melting Point, °C. |
|---|---|---|---|---|---|---|---|---|---|
| | $R^1(\beta)$ | $R^2(\alpha)$ | | | | Am | H | | |
| Ia | —CO—CH₃ | ...H | H₂ | —CH₃ | H₂ | —N⟨⬠ | β | ....α | —H β | 132–133 (tube). |
| Ib | —CO—CH₃ | ...H | H₂ | —CH₃ | H₂ | ...N⟨⬠ | α | —β | —H β | 116–118 (tube and K). |
| Ic | —CO—CH₃ | ...H | H₂ | —CH₃ | H₂ | —N⟨⬠ | β | ....α | ....H α | {127–129 (tube). {128–130 (K). |
| Id | —CO—CH₃ | ...H | H₂ | —CH₃ | H₂ | ...N⟨⬠ | α | —β | ....H α | {104–106 (tube). {106–108 (K). |
| Ie | —CO—CH₃ | ...H | H₂ | —CH₃ | H₂ | —N⟨⬠ | β | .....α | Δ4–5 | 136–138 (K). |
| If | —CO—CH₃ | ...H | H₂ | —CH₃ | H₂ | —N(CH₃)₂ | β | .....α | —H β | 96–97 (tube). |
| Ig | —CO—CH₃ | ...H | H₂ | —CH₃ | H₂ | —N⟨⬡⟩ | β | .....α | —H β | 121–122 (tube). |
| Ih | —CO—CH₃ | ...H | H₂ | —CH₃ | H₂ | —N⟨⬡O⟩ | β | .....α | —H β | 144–145 (tube). |

TABLE I—Continued

| Compound having Formula I | Position 17 ($R_1+R_2$) $R^1(\beta)$ | $R^2(\alpha)$ | Position 11 $R^3$ | Position 10 $R^4(\beta)$ | Positions 6 and 16 $R^5$ | Position 3 Am | H | Position 5 X | Melting Point, °C. |
|---|---|---|---|---|---|---|---|---|---|
| Ii | —CO—CH₃ | ...H | H₂ | —CH₃ | H₂ | ...N⟨ ⟩O α | —β | —H β | 136–137 (tube). |
| Ij | —CO—CH₃ | ...H | H₂ | —CH₃ | H₂ | —N⟨ ⟩N—CH₃ β | .....α | —H β | 162–164 and 168–169 (tube). |
| Ik | —CO—CH₃ | ...H | H₂ | —CH₃ | H₂ | ...N⟨ ⟩N—CH₃ α | —β | —H β | 147–149 (tube). |
| Il | —CO—CH₃ | ...H | H₂ | —CH₃ | H₂ | —NH—CH₃ β | .....α | —H β | 81–82 (tube). |
| Im | —CO—CH₃ | ...H | H₂ | —CH₃ | H₂ | —NH—CH₂—⟨φ⟩ β | .....α | —H β | 138–140 (tube). |
| In | —CO—CH₃ | ...H | H₂ | —CH₃ | H₂ | ...NH—CH₂—⟨φ⟩ α | —β | —H β | >265 (K). |
| Io | —CO—CH₃ | ...H | H₂ | —CH₃ | H₂ | —NH₂ β | .....α | —H β | 120–122 (tube). |
| Ip | —CO—CH₃ | ...H | H₂ | —CH₃ | H₂ | ...NH₂ α | —β | —H β | 123–125 (tube). |
| Iq | —CO—CH₃ | ...H | H₂ | —CH₃ | H₂ | —NH₂ β | .....α | ...H α | 157–158 (tube). |
| Ir | —CO—CH₃ | ...H | H₂ | —CH₃ | H₂ | —NH—CO—CH₃ β | .....α | —H β | 127–128 (tube). |
| Is | —CO—CH₃ | ...H | H₂ | —CH₃ | H₂ | —N=CH—⟨φ⟩ β | .....α | —H β | 197–198 (tube). |
| It | —CO—CH₃ | ...H | H₂ | —CH₃ | H₂ | —N=CH—⟨φ⟩ β | .....α | ...H α | 202–204 (tube). |
| Iu | —CO—CH₃ | ...H | H₂ | —CH₃ | H₂ | ...N=CH—⟨φ⟩ α | —β | ...H α | 200–202 (tube). |
| Iv | —CO—CH₃ | ...H | H₂ | —CH₃ | H₂ | —N=CH—⟨φ⟩—OCH₃ β | .....α | —H β | 179–180 (tube). |
| Iw | —CO—CH₃ | ...H | H₂ | —CH₃ | H₂ | —N=CH—⟨φ⟩—OCH₃ β | .....α | ...H α | 193–194 (tube). |
| Ix | —CO—CH₃ | ...H | H₂ | —CH₃ | H₂ | —NH—CH₂—⟨φ⟩—OCH₃ β | .....α | —H β | 124–125 (tube). |
| Iy | —OH | ...H | H₂ | —CH₃ | H₂ | —N⟨ ⟩ β | .....α | Δ 4–5 | 196–203 (K). |
| Iz | —OH | ...H | H₂ | —CH₃ | H₂ | —N⟨ ⟩ β (?) | .....α | ...H α | 179–182 (tube). |
| Iaa | —OH | ...H | H₂ | —CH₃ | H₂ | —N⟨ ⟩ β (?) | .....α | —H β (?) | 234–236 (K). |
| Iab | —OH | ...H | H₂ | —CH₃ | H₂ | —N(CH₃)₂ β (?) | .....α | ...H α | 172–174 (tube). |
| Iac | —CHOH—CH₃¹ | ...H | H₂ | —CH₃ | H₂ | ...N⟨ ⟩ α | —β | —H β | 152–156 (K) (double). |
| Iad | —CHOH—CH₃¹ | ...H | H₂ | —CH₃ | H₂ | —N⟨ ⟩ β | .....α | Δ 4–5 | 174–177 (K). |
| Iae | —CO—CH₂OH | ...H | H₂ | —CH₃ | H₂ | —N⟨ ⟩ β | .....α | —H β | 152–154 (tube). |
| Iaf | —CO—CH₂OH | ...H | H₂ | —CH₃ | H₂ | ...N⟨ ⟩ α | —β | —H β | 157–159 (K). |
| Iag | —CO—CH₂OH | ...H | H₂ | —CH₃ | H₂ | —N⟨ ⟩ β | .....α | Δ 4–5 | 184–186 (K). |
| Iah | —CO—CH₂OH | ...OH | =O | —CH₃ | H₂ | ∾N(CH₃)₂(HCl) } | ∾ } | ∾H } | 265 (K). |
| Iai | —CO—CH₂OH | ...OH | =O | —CH₃ | H₂ | ∾N⟨ ⟩ (HCl) } | ∾ } | ∾H } | >265 (K). |
| Iaj | —CO—CH₂OH | ...OH | =O | —CH₃ | H₂ | ∾N⟨ ⟩ ½H₂O } | ∾ } | ∾H } | 228–230 (tube). |
| Iak | —CO—CH₂OCOCH₃ | ...H | H₂ | —CH₃ | H₂ | ...N⟨ ⟩ α | —β | —H β | 132–133–(K). |
| Ial | —CO—CH₂OCOCH₃ | ...H | H₂ | —CH₃ | H₂ | —N⟨ ⟩ β | .....α | Δ 4–5 | 113–118 (K). |
| Iam | —CO—CH₂OCOCH₃ | ...H | H₂ | —CH₃ | H₂ | —NH₂ β | .....α | —H β | 176–178 (tube). |
| Ian | —CO—CH₂OCOCH₃ | ...H | H₂ | —CH₃ | H₂ | —NH—CO—CH₃ β | .....α | —H β | 128–131 (tube). |

TABLE I—Continued

| Compound having Formula I | Position 17 ($R^1+R^2$) $R^1(\beta)$ | $R^2(\alpha)$ | Position 11 $R^3$ | Position 10 $R^4(\beta)$ | Positions 6 and 16 $R^5$ | Position 3 Am | H | Position 5 X | Melting Point, °C. |
|---|---|---|---|---|---|---|---|---|---|
| Iao | —CO—CH$_2$OCOCH$_3$ | | ...H | H$_2$ | —CH$_3$ H$_2$ | —N=CH—$\phi$ $\beta$ | | .....$\alpha$ | —H $\beta$ | 132–134 (tube). |
| Iap | —CO—CH$_2$OCOCH$_3$ | | ...OH$\beta$ / H$\alpha$ | | —CH$_3$ H$_2$ | ⁓NH$_2$ | | ⁓ | ⁓H | Not determined. |
| Iaq | —CO—CH$_2$OCOCH$_3$ | | ...OH$\beta$ / H$\alpha$ | | —CH$_3$ H$_2$ | ⁓N=CH—$\phi$ | | ⁓ | ⁓H | 204–205 (tube). |
| Iar | —CHOH—CH$_2$OH¹ | | ...H | H$_2$ | —CH$_3$ H$_2$ | —N⟩ $\beta$ | | .....$\alpha$ | —H $\beta$ | 188–190 (tube). |
| Ias | —CHOH—CH$_2$OH¹ | | ...H | H$_2$ | —CH$_3$ H$_2$ | ...N⟩ $\alpha$ | | —$\beta$ | —H $\beta$ | 254–256 (K). |
| Iat | —CHOH—CH$_2$OH¹ | | ...H | H$_2$ | —CH$_3$ H$_2$ | —N⟩ $\beta$ | | .....$\alpha$ | Δ4-5 | 210–212 (K). |
| Iau | —CHOH—CH$_2$OH¹ | | ...H | H$_2$ | —CH$_3$ H$_2$ | ...N⟩ $\alpha$ | | —$\beta$ | —H $\beta$ | 238 (K). |
| Iav | —CHOH—CH$_2$OH¹ | | ...H | H$_2$ | —CH$_3$ H$_2$ | ...N⟩O $\alpha$ | | —$\beta$ | —H $\beta$ | 227–229 (K). |
| Iaw | —CHOH—CH$_2$OH¹ | | ...H | H$_2$ | —CH$_3$ H$_2$ | ...N⟩N—CH$_3$ $\alpha$ | | —$\beta$ | —H $\beta$ | 203–204 (K). |
| Iax | —CHOH—CH$_2$OH¹ | | ...H | H$_2$ | —CH$_3$ H$_2$ | —NH$_2$ $\beta$ | | .....$\alpha$ | —H $\beta$ | 132–136 (K). |
| Iay | —CHOH—CH$_2$OH¹ | | ...H | H$_2$ | —CH$_3$ H$_2$ | —N=CH—$\phi$ $\beta$ | | .....$\alpha$ | —H $\beta$ | 156–158 (K). |
| Iaz | —CH—CH$_2$¹ \ O O / CHOH | | ...H | H$_2$ | —CH$_3$ H$_2$ | ...N(CH$_3$)$_2$ $\alpha$ | | —$\beta$ | —H $\beta$ | {110–115 and 152–154 (K).} |
| Iba | —CH—CH$_2$¹ \ O O / CHOH | | ...H | H$_2$ | —CH$_3$ H$_2$ | ...NH—CH$_2$—$\phi$ $\alpha$ | | —$\beta$ | —H $\beta$ | 94–96 (K). |

¹ $\beta$—OH at C20.

Also included are the salts which the above-described compounds form with such pharmaceutically acceptable mineral and organic acids as hydrochloric, formic, acetic, fumaric, maleic, citric and ascorbic acids, as well as in the case of the tertiary amines their quaternary compounds, more especially the methiodides.

Prior to the present invention, only a small number of compounds of Formula I above have been known. Thus all the compounds set out in Table I above are new and are comprised within the scope of the invention. Among the compounds already known and corresponding to Formula I, there may be mentioned in particular funtumine, IA($R^1$=$\beta$—CO—CH$_3$; $R^2$=$\alpha$ . . . H; $R_3$=H$_2$; $R_4$=$\beta$—CH$_3$; $R_5$=H$_2$; X=—H at 4 and . . . H at 5$\alpha$, $R^4$=$\beta$—CH$_3$; $R_5$=H$_2$; X=—H at 4 and . . . H at 5$\alpha$, Am=$\alpha$ . . . NH$_2$). This was isolated by Janot and coworkers (Comp. Rend., 1958, volume 246, page 3076) from *Funtumia latifolia*, one of the Apocyanacae species.

The applicants have found that compounds of Formula I, both known and novel, can readily be prepared according to one or other of the following two methods, both of which use as starting materials ketones having the general Formula II:

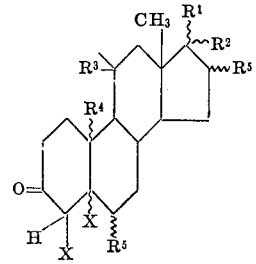

II in which $R^1$, $R^2$, $R^3$, $R^4$, $R^5$ and X are defined above in connection with the general Formula I and more especially those ketones for which the symbols have the following meanings:

TABLE II

| Compound having Formula II | Position 17 ($R^1+R^2$) $R^1(\beta)$ | $R^2(\alpha)$ | Position 11 $R^3$ | Position 10 $R^4$ | Positions 6 and 16 $R^5$ | Position 5 (x-x) | Common name of Substance |
|---|---|---|---|---|---|---|---|
| IIa | —CO—CH$_3$ | | ...H | H$_2$ | —CH$_3\beta$ | H$_2$ | Δ4-5 | Progesterone. |
| IIb | —CO—CH$_3$ | | ...H | H$_2$ | —CH$_3\beta$ | H$_2$ | ...H$\alpha$ | Allopregnanedione. |
| IIc | —CO—CH$_3$ | | ...H | H$_2$ | —CH$_3\beta$ | H$_2$ | ——H$\beta$ | Pregnanedione. |
| IId | —OH | | ...H | H$_2$ | —CH$_3\beta$ | H$_2$ | ...H$\alpha$ | Androstanolone. |
| IIe | —OH | | ...H | H$_2$ | —CH$_3\beta$ | H$_2$ | Δ4-5 | Testosterone. |
| IIf | —CO—CH$_2$OH | | ...H | H$_2$ | —CH$_3\beta$ | H$_2$ | Δ4-5 | Desoxycorticosterone (DOC). |
| IIg | —CO—CH$_2$OH | | ...H | H$_2$ | —CH$_3\beta$ | H$_2$ | ——H$\beta$ | Hydro-DOC. |
| IIh | —CHOH—CH$_2$OH¹ | | ...H | H$_2$ | —CH$_3\beta$ | H$_2$ | ——H$\beta$ | (None). |
| IIi | —CO—CH$_2$OCOCH$_3$ | | ...H | H$_2$ | —CH$_3\beta$ | H$_2$ | Δ4-5 | Acetate of DOC (DOCA). |
| IIj | —CO—CH$_2$OCOCH$_3$ | | ...H | H$_2$ | —CH$_3\beta$ | H$_2$ | ——H$\beta$ | Hydro-DOCA. |
| IIk | —CO—CH$_2$OH | | ...OH | =O | —CH$_3\beta$ | H$_2$ | Δ4-5 | Cortisone. |
| IIl | —CO—CH$_2$OCOCH$_3$ | | ...OH | /OH$\beta$ \H$\alpha$ | —CH$_3\beta$ | H$_2$ | Δ4-5 | Hydrocortisone acetate. |

¹ $\beta$—OH at C20.

The first method consists in treating a ketone having the general Formula II with an amine, preferably a secondary amine, and with formic acid: these are used simultaneously if the ketone used lacks a double bond between positions 4 and 5 as well as a free ketone group in the side chain attached to the 17-carbon atom. Otherwise they can be used one after the other, that is to say with the formation of an intermediate "enamine" which is then reduced by the formic acid. The process in this latter form is of interest because it can be applied to polyketo-steroids and to those with a double bond between the 4 and 5 positions. In this case, however, it is limited to amines which readily give with ketones what is conveniently called an "enamine"; in particular, to pyrrolidine. It is also limited to compounds having the general Formula II which have a methyl group in position 10 ($R^4 = -CH_3$) and which are free from a hydroxyl group at position 6. In the form of its two variants the process in general leads mainly to steroids having an amino group orientated equatorially at position 3 if ring A is saturated, or quasi-equatorially when there is a double bond at position 4.

Certain of the intermediate "enamines" having the general Formula III given below are new compounds, more particularly the 3-pyrrolidinyl-21-hydroxy-pregna-3,5-diene-20-one and 3-pyrrolidinyl-21-hydroxy-5β-pregn-3-ene-20-one.

In the general Formula III $R^1$, $R^2$, $R^3$, $R^5$ and Am are as defined in connection with general Formula I, while Y represents either ~H at position 5 and $H_2$ or

at position 6, or otherwise a double bond between the 5 and 6 positions with either —H or —$CH_3$ at position 6.

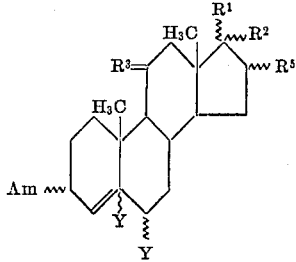

The second method enables the preparation, usually as the main product, of steroid amines having an amino group, having the β configuration at position 3, while the 3α isomers may occasionally be isolated in substantial amounts from the reaction mixture. It comprises treating ketones of the general Formula II with ammonia or a primary or secondary amine and with hydrogen in the presence of suitable hydrogenation catalysts.

The Am group can have any of the meanings given to it in connection with Formula I above. Also the ketosteroids II used as starting materials may have one or more substituents which are inert towards hydrogen under the conditions of hydrogenation.

Basically the groups $R^1$ and $R^2$ (Formula I) at position 17 in the cyclopentanoperhydrophenanthrene nucleus remain unchanged, whatever the mode of operation used, but secondary reactions may nevertheless occur. Thus hydrolysis of ester and other groups known to be extremely labile when in contact with aqueous acid or alkali, can occur unexpectedly. In the same way esterification of hydroxyl groups present is sometimes observed, more especially the formation of cyclic orthoformic esters when a compound having the general Formula II having a glycol grouping at positions 20 and 21 is in contact in the reaction mixture with a formamide, which latter has been generated spontaneously during the course of the reaction or has been added as a source of formic acid.

To determine the spatial arrangement of the compounds described herein, the applicants have made the 3-para-toluenesulphonates (tosylates) of the 3-hydroxy-steroids and then submitted them to aminolysis, the 3-hydroxy-steroids and the amines being chosen so as to give 3-amino compounds of planar configuration identical with that of the compounds here described. Comparison has then been made, taking into account the well-known fact that aminolysis is accompanied by inversion of configuration (SN2 type of reaction; see for example: Pierce and co-workers, J. Chem. Soc., 1955, page 694; Shoppee and co-workers, J. Chem. Soc., 1956, page 1649; Sauers, J. Amer. Chem. Soc., 1958, volume 80, page 4721).

Thus in the 5 αH series, by reacting pyrrolidine under slight pressure and at about 120° C. with tosylated 3β-hydroxy-5α-pregnane-20-one (Ruff and Reichstein, Helv. Chim. Acta, 1951, volume 34, page 70) made by reacting the latter with tosyl chloride, 3α-pyrrolidinyl-5α-pregnane-20-one (Formula IV) is obtained (M.P. (K); 106°–108° C., (tube): 104°–106° C.), identified with the compound Id, isolated as a by-product when hydrogen and pyrrolidine react with allopregnanedione IIb in the presence of palladium supported upon charcoal. The melting point and mixed melting point are identical. In addition the infrared spectra are superimposable. Furthermore,

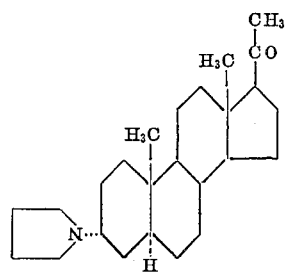

the principal product obtained by the action of hydrogen and pyrrolidine on allopregnanedione IIb is identical with that obtained on reduction by formic acid of the pyrrolidine enamine corresponding to IIb. The structure Ic attributed to them is thus certainly correct.

Actually the presence of a keto group at position 20, allo to position 5, is equally well confirmed for Ic as for Id, by examination of the infrared spectrum (R. Norman Jones, F. Herling and E. Katzenellebogen, J. Amer. Chem. Soc., 1955, volume 77, page 651). Since Ic and Id are isomers they can only differ with respect to the configuration about carbon atom 3. The pyrrolidine group in Ic can then only be 3β and hence equatorial.

In the same way, in the normal series (5βH), hydro-4, 5β-desoxycorticosterone (IIg) has been reduced by sodium borohydride. The configuration 3α-OH, 20β-OH is ascribed with complete certainty to the triol obtained in the reaction. Detailed examination of the infrared spectrum does in fact confirm this stereo-configuration, which was a priori foreseen on the basis of the analogous reactions described in the literature (see for example: Nussbaum, J. Amer. Chem. Soc., 1959, volume 81, page 1228; Wheeler and Mateos, Chem. and Ind., 1957, page 395). The triol is then treated with acetone in the presence of anhydrous copper sulphate (as described by Reichstein, United States patent specification No. 2,423,517). In this way the hydroxyl groups of the α-glycol portion of the side chain are selectively blocked as a ketal. The latter is then treated with para-toluenesulphonyl chloride and the free hydroxyl group at position 3 is thereby esterified. The ketal ester is not isolated. The very labile ketal group is hydrolysed during attempts at recrystallisation and actually the ester of the glycol is obtained. The latter is treated with pyrrolidine at about 120° C. under slight pressure. Aminolysis of the tosylate brings about inversion of configuration at position 3 and a satisfactory yield of 3β-pyrrolidinyl-5β-pregnane-20β,21-diol (Iar) is isolated, M.P. (K): 187°–191° C.:

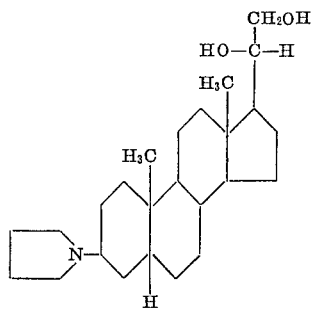

This aminated sterol diol with a 3β axial configuration has proved to be identical with the compound obtained by the action of pyrrolidine and hydrogen, in the presence of palladium supported upon charcoal, on 20β,21-dihydroxy-5β-pregnane-3-one (IIh). The melting point and mixed melting point are identical and in addition the infrared spectra are superimposable.

On the other hand, the product obtained by reducing the same starting ketone IIh with pyrrolidine and formic acid is an aminated diol isomeric with the preceding one, but differentiated sharply therefrom by its infra-red spectrum, by its melting point ((K): 254°–256° C.), and by the depressed mixed melting point obtained from the two substances. Thus the diol produced by reduction with formic acid is given the formula Ias, 3α-pyrrolidinyl-5β-pregnane-20β,21-diol, with a 3α amino group, which is thus equatorial.

To ascertain the structure of the amines produced by reduction with formic acid of the pyrrolidine enamine derivatives of 3-ketosteroids having a double bond in the 4–5 position, the 3β-pyrrolidinyl-pregna-x-ene-20-one, obtained by the action of formic acid on the pyrrolidine enamine of progesterone, is treated with hydrogen in the presence of palladium. One molecule of hydrogen is taken up and 3β-pyrrolidinyl-5α-pregnane-20-one, Ic, whose configuration is known with certainty (see above), is isolated as the sole reaction product. This enables an unequivocal assignment of the 3-β configuration to the amino group of the unsaturated amine, since the centre of asymmetry at C3 is not able to change during the hydrogenation.

On the other hand, the double bond present in the unsaturated amines cannot be elsewhere than between positions 4 and 5. Actually, according the method of preparation the double bond could only be between the carbon atoms 4 and 5 or alternatively between 5 and 6. But the differences in the molecular rotation between these unsaturated amines and the steroids having the nuclei A and B saturated (5α series) is between +55 and +65. It is therefore of the same order of magnitude as the difference in the molecular rotation between 3β-benzylamino-cholest-4-ene and 3β-benzylamino-5α-cholestane (the difference in molecular rotation lies between +18 and +32) and is in no wise comparable with the difference in molecular rotation between the 3β-aminosteroids having a double bond between the 5 and 6 positions and the corresponding reduced derivatives (5α-H), which is between −132 and −245 (cf. Janot, Cave and Goutarel, Bull. Soc. Chim., France, 1959, page 836).

Study of infra-red spectra has made a useful contribution towards determining the structure of the aminosteroids prepared according to the present invention. Thus a certain number of bands characteristic of each type of spatial isomerism at positions 3 and 5 could be adduced as evidence, but most of the bands vary according to the nature of the amino group and can no longer be recognised in the presence in the molecule of functional groups with a very marked tendency to associate (especially hydroxyl groups) or again if the sterol amine is investigated in the form of a salt. Subject to these reservations, it has been noted that primary amines give rise to absorption which is not very intense, but which is sharp, over the region 6.25–6.30μ (deformation of N—H bond) only for those sterols aminated at the 3α-position, whilst those sterols aminated at the 3β-position have little or no absorption in this region. Furthermore, there has been noted in the 14.70μ region a band which is characteristic only of the compounds having an axial primary amino group and which is completely absent from the equatorial derivatives.

For the tertiary amines:
(I) In the region 7.0–7.6μ (absorption doubtless due to vibrations of

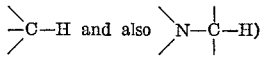

a doublet is always observed with those compounds having the amino group equatorial and a hydrogen atom axial, whilst if the amino group is axial and a hydrogen atom is equatorial there is a triplet. It is evident that spectra measured in suspensions in liquid paraffin cannot give any useful information in this region.

(II) Most of the steroids with a tertiary amino group absorb in the region 11.35–11.60μ; the equatorial amines have a band at 11.36–11.38μ, while the corresponding axial amines have a band between 11.50 and 11.60μ.

Furthermore, the study of the infra-red spectra sometimes gives (more especially when hydroxyl groups are absent) very precise information concerning the configuration at position 5 (whether α or β) for the 20-keto-steroids, as the presence of a functional amino group at position 3 does not seem in the least to disturb the characteristic bands of normal or allo ketones over the band between 1300 cm.$^{-1}$ and 900 cm.$^{-1}$.

It is to be noted that the infra-red spectra have been recorded with a double-beam Baird spectrograph having sodium chloride prisms, using compensated solutions (chloroform, methylene dichloride, carbon disulphide or carbon tetrachloride) or a suspension in liquid paraffin except that certain steroids melting below 135° C. have sometimes been examined as a thin layer, after melting and resolidification on a rocksalt plate (microcell).

The compounds set forth in Table I have been submitted to many tests affording evidence about their pharmacodynamic properties, and in particular as to their action on the central nervous system. Among the tests may be mentioned: toxicity tests on mice, rats and cats; impairment of balance, mainfestations of catatonia; degree of anorexia; modification of aggressiveness (rat with respect to rat, cat with regard to mouse), effect on spontaneous movement or that induced by benzedrine; antagonism to the catatonia-inducing effect of perchlorperazine, and effect on the behaviour of conditioned animals.

These compounds have been administered as the base or as salts, either parenterally or orally.

In general the compounds Io, Ip, Iq and Iam, having an amino group in the 3-position, have shown themselves to be sedatives. The compound Io showed itself to have exceptional properties. It has moderate toxicity (DL 50 IP 175 mg./kg., DL 50 oral 1 g./kg.).

Administered intraperitonally it allays aggressiveness in rats at a dosage of 15 mg./kg. and aggressiveness in cats at 2.5 mg./kg., and this action persists for 24 hours. When administered to cats in doses of 10 and 20 mg./kg., the sedative action lasts several days. At these dosages the product does not affect either the arterial blood pressure or the cardiac rhythm. Doses of 50 mg./kg. must be used to affect the motor functions of the rat or the balance of the mouse. With high doses (100 mg./kg.) catatonia is not induced in mice.

This product Io has a synergistic effect when used with various sedatives or tranquillisers. If a rat is simultaneouly given an ineffective dosage (1 mg./kg.) of this compound together with an equally ineffective dosage of acepromazine (1 mg./kg.) or of chlorpromazine, it produces a powerful sedative effect.

Another especially active product is 3α-pyrrolidinyl-21-hydroxy-5β-pregnane-20-one (I*af*). Slightly more toxic than I*o*, it has shown sedative properties with respect to aggressiveness in rats at dosage between 50 and 75 mg./kg. administered intraperitonally. Given to cats a sedative effect is observed from 5 mg./kg. and at dosages of 10 to 20 mg./kg. this effect can last for several days. At such dosages this compound neither modifies arterial pressure nor cardiac rhythm and leaves the motor conduction and those functions for preserving balance practically unchanged.

Other compounds of interest are: the I*ao* compound, which is a benzylideneamine derivative of hydrodesoxycorticosterone acetate II*j*; I*b* (the 3α-pyrrolidinyl derivative of 5β-pregnane-20-one); I*ac* (the 3α-pyrrolidinyl derivative of 5β-pregnane-20β-ol); I*as* (the 3α-pyrrolidinyl derivative of 5β-pregnane-20β,21-diol), and the compounds I*ar* (the 3β-pyrrolidinyl derivative of 5β-pregnane-20β,21-diol) and I*au* (the 3α-piperidinyl derivative of 5β-pregnane-20β,21-diol).

The first method which can be used for making aminosteroids having the general Formula I consists in simultaneously treating ketones having the general Formula II with an amine, preferably a secondary amine, and formic acid, under the conditions for carrying out the Leuckart reaction, which has already been applied to certain steroids by R. R. Sauers (J. Amer. Chem. Soc., 1958, volume 80, page 4721) for the preparation of 3β-monoalkylamino and 3β-dialkylamino cholestanes, free from oxygen-containing substituents on the 17-carbon atom or in the side chain.

The applicants have found that if there are hydroxyl groups in the steroid used as starting material, these are not in general esterified by formic acid even though it be added in an amount in marked excess of that theoretically required.

As an exception it has been observed that formation of a cyclic orthoformate occurs when a compound of the general Formula II having an α-glycol grouping at positions 20 and 21 is in contact, in the reaction mixture, with a formamide, the latter having arisen spontaneously in the course of the reaction or having been added as a source of formic acid and amine under the working conditions employed.

Moreover, the applicants have found that not only are purer products obtained but that these products are obtained more rapidly if the reaction mixture is not finally treated with hydrochloric acid to produce a hydrochloride which has to be isolated in a solid state before the base is liberated, but rather if one dilutes the reaction mixture with water and then makes the diluted reaction mixture alkaline so that the base passes into the organic phase, from which it can then be isolated in a state of great purity by crystallisation.

The following examples illustrates the first procedure in its first form (use of amine and formic acid together).

EXAMPLE 1

3α-piperidinyl-5β-pregnane-20β,21-diol (I*an*)

To 5 g. of 20β,21-dihydroxy-5β-pregnane-3-one (II*h*) (M.P. (K): 163° C.) are added 6 ml. of piperidine. The mixture is heated to 80° C. in a 25 cc. flask fitted with a reflux condenser, to effect solution. 4.5 mls. of formic acid are then added dropwise. A brisk reaction takes place. The temperature is then raised in an oil bath which is at 165° C. to 200° C., more specifically to about 175° C. and maintained thereat for 7 to 10 hours.

After cooling, the product is diluted with 500 cc. of water and acidified, if necessary, with formic acid. It is then extracted thrice with ether to remove the neutral fraction. The aqueous solution is then made alkaline with dilute sodium carbonate solution. A little ether is added and the free amine crystallises. The solvent is allowed to evaporate, the crystals dried, washed with distilled water and then dried in vacuo. The product is 3α-piperidinyl-5β-pregnane-20β,21-diol, 4.7 g.; M.P. (K): 200°–220° C. Recrystallisation from n-propanol raises the melting point to 238° C. (K).

EXAMPLES 2–4

Example 1 is repeated respectively replacing the piperidine by morpholine, pyrrolidine and N-methyl piperazine. The following compounds are obtained in the same way:

3α-morpholinyl-5β-pregnane-20β,21-diol (I*av*), melting point after recrystallisation from methanol: M.P. 227°–229° C. (K); ultimately the compound decomposed on the block.

3α-pyrrolidinyl-5β-pregnane-20β,21-diol (I*as*) melting point after recrystallisation from methanol: M.P. 254°–256° C. (K); ultimately the product decomposed on the block.

3α - (4-methyl-1-piperazinyl)-5β-pregnane-20β,21-diol (I*aw*), melting point after recrystallisation from ethyl acetate: M.P. 203°–204° C. (K); ultimately the product decomposed on the block.

EXAMPLE 5

Preparation of the orthoformate of 3α-benzylamino-5β-pregnane-20β,21-diol (I*ba*)

To 1.7 g. of 20,21-dihydroxy-5-pregnane-3-one (II*h*), 0.005 mol. are added 2.2 ml. of benzylamine (0.02 mol), followed by 1.5 ml. of formic acid (0.04 mol). The mixture is heated in a sealed tube, in an oil bath at 170°–180° C. for 10.5 hours; it becomes homogeneous. After cooling, the amber-yellow product is dissolved in a little ethyl alcohol, then 10 ml. of concentrated hydrochloric acid added. The mixture is boiled under reflux to hydrolyse the formamide formed as an intermediate. The hydrochoride of the amino-steroid formed is precipitated with water, dried, suspended in chloroform and the amine displaced by adding ammonia. It passes into the chloroform whence it is isolated as an oil after drying with calcuim chloride and evaporation of the solvent.

The orthoformate of 3α-benzylamino-5β-pregnane-20β, 21-diol (I*ba*) is obtained crystalline after dissolving the oil in acetone and slowly evaporating the solvent. Yield: 1.08 g., M.P. (K): 93°–96° C.

A pure sample for analysis of I*ba* is obtained on recrystallisation from 60% aqueous acetone, M.P. 94°–96° C. (K). The hydrochloride of the base I*ba*, recrystallised from methanol, melts at 254°–260° C. (K).

The infra-red spectrum of the molten base shows the absence of compounds with the C=O group, while a broad band towards 1040 cm.$^{-1}$ may very well be bands due to the C—O—C of the glycol orthoformate (cf. Bodenbenner, Annalen der Chemie, 1959, volume 623, page 183).

EXAMPLE 6

Preparation of the orthoformate of 3α-dimethylamino-5β-pregnane-20β,21-diol (I*az*) from 20β,21-dihydroxy-5β-pregnane-3-one (II*h*), dimethylformamide and formic acid 1.23 g. of 20β,21-dihydroxy-5β-pregnane-3-one (II*h*) is dissolved in 1.05 ml. of dimethyformamide. 0.54 ml. of formic acid is added dropwise to this solution. A copious white precipitate is formed. The mixture is heated under reflux for 6 hours on an oil bath which is between 150° and 190° C., more especially between 170° and 175° C.

After cooling the partly crystallised reaction product is dissolved in water and filtered to remove a small amount of an insoluble product which is washed with formic acid. The filtrate is extracted with ether to extract the non-basic material. The aqueous solution is then made alkaline and the liberated amine extracted with a little ether. The solvent is then allowed to evaporate and the dirty-grey product washed with water and dried in vacuo, weight 0.371 g.

After treating with isopropyl ether, an amino ester is isolated in crystalline form and purified by recrystallisation from ethyl acetate. The pure product has a "double"

melting point, firstly at 110°–115° C. and then at 152°–154° C. (K). Its empirical formula corresponds with that of a monoformate of 3α-dimethylamino-5β-pregnane-20β,21-diol. By analogy with Example 5, however, it is more likely that it is the orthoformate of 3α-dimethylamino-5β-pregnane-20β,21-diol (I*az*).

When the secondary amine used can readily give an "enamine" having the general Formula III with the sterol ketone employed, it is preferable to effect the reductive amination in two stages:
(a) "Enamination";
(b) Formic acid reduction of the "enamine."

Actually the steroid employed as starting material may contain a plurality of keto groups, in particular one in position 20, without an amino group being introduced anywhere other than at position 3.

In fact it it well known from the work of Herr, Heyl and their co-workers (see particularly J. Am. Chem. Soc., 1953, volume 75, page 1918; 1953, volume 75, page 5927; 1956, volume 78, page 430; 1955, volume 77, page 488; 1956, volume 78, page 500; French patent specification No. 1,098,526; German patent specification No. 1,011,-419; United States patent specifications Nos. 2,733,072 and 2,781,368, and British patent specifications Nos. 740,-568, 756,400, 763,835, 763,836 and 779,001) that enamination of sterol polyketones takes place solely at position 3, subject only to the rare exceptions pointed out by these authors.

Hence it is unnecessary, in this embodiment of the invention, selectively to block carbonyl groups other than the carbonyl group at position 3 before carrying out the reductive enamination. This is a very great advantage in comparison with the classical Leuckart reaction, because very much more readily accessible starting materials can be used.

Moreover, it is a well-known fact that unsaturated α-β-ketones cannot be converted into amines by means of the Leuckart reaction (Organic Reactions, volume 5, page 310).

Now the applicants have found that by reductive amination in two stages, steroids aminated at position 3 can be obtained without difficulty from the corresponding 3-ketones with a double bond between the 4 and 5 positions. The formyl reduction of an intermediate "enamine" having one double bond at position 3 and another at position 5 results in unsaturated amines having a double bond at position 4; this can be deduced from calculations of the molecular rotation (see above).

In order to carry out the "enamination," which is the first stage of the process of the invention, it is possible to proceed as described in the literature, in particular by Herr and Heyl (loc. cit.). However, the applicants have found that a better yield of "enamines," particularly of those derived from ketones without a double bond at the 4 position, is obtained if the secondary amine is added to a benzene solution of the 3-ketosteroid which has previously been brought to the boil under reflux.

With regard to the reduction of the "enamines," this is effected by the addition of formic acid to a solution of the enamine in an organic solvent. Usually the reduction takes place in the cold, but it is often convenient to heat somewhat, at least to initiate the reaction. Choice of solvent is important, since with some the desired reduction does not take place. In general aromatic hydrocarbons such as benzene, toluene, or xylene may be used; these are mentioned by way of example only. Though it is sometimes desirable to isolate the intermediate enamine prior to effecting reduction thereof, it is often preferable to reduce a freshly-prepared benzene solution of the enamine, made as described above, by means of formic acid. This merely necessitates use of an excess of acid to neutralise the amine, which latter is always present in considerable excess.

On the other hand, it is sometimes useful, in order to avoid as far as possible resinification of the intermediate enamine (which is always very unstable when it is prepared in the hot, even under nitrogen) to effect the operation in the cold using a very slight excess of secondary amine, more particularly pyrrolidine, preferably in a polar organic solvent having a fairly low boiling point, more especially methanol. The quantity of solvent employed is not critical for successful working and it is not necessary that all the steroid be dissolved therein. Addition of pyrrolidine brings about solution, followed by immediate recrystallisation of the enamine which is only slightly soluble in the reaction mixture. It is then sufficient to evaporate the solvent and the slight excess of pyrrolidine at a very low pressure. It should be noted that in a non-polar solvent, such as benzene, the reaction does not take place (or is reversible) in the cold, except in the presence of dehydrating agents such as calcium carbide.

The crude enamine is then redissolved in benzene and treated with formic acid in accordance with the procedure already described.

Several typical examples which follow illustrate the several methods of operation for carrying out the reductive amination of the invention in two distinct stages.

EXAMPLE 7

Preparation of 3β-pyrrolidinyl - 3β - androst-4-ene-17β-ol (I*y*) via the pyrrolidinyl "enamine" derived from testosterone.

A flask, fitted with Soxhlet apparatus containing a thimble filled with powdered calcium carbide, is charged with 5.76 g. of testosterone (II*c*), 6 ml. of pyrrolidine, and 100 ml. of benzene. After an hour's boiling under reflux, no more bubbles are formed inside the calcium carbide, and the enamination is regarded as completed. Heating is discontinued, the Soxhlet apparatus is replaced by a reflux condenser, and 4 ml. of formic acid is then added dropwise to the reaction mixture. A violent reaction takes place. There is a sharp evolution of gas, and an orange-coloured oil is formed, which floats on the surface of the benzene. When the reaction slackens, the mixture si heated under reflux. After 3 hours it is allowed to cool. The lower, orange-coloured, layer crystallises spontaneously. After filtering, the long needles are sucked dry and washed with benzene. A little oily product passes into the filtrate. The crystalline product is dried in vacuo; yield 5.623 g. (having M.P. (K): 160°–180° C.: pasty state). The product is the still impure formate of 3β-pyrrolidinyl-androst-4-ene-17β-ol. Recrystallisation from isopropanol and dioxane gives it the form of pale yellow crystals (M.P. (K): 165°–180° C. decomp.)

The benzene solution and the oily product which passes through the filter are treated with dilute formic acid. The benzene layer containing neutral compounds is removed in a separating funnel. The aqueous layer is then made alkaline with sodium carbonate solution and the liberated amine is then extracted with benzene, and the benzene solutions dried over sodium sulphate. After removing the solvent in vacuo, the amine crystallises spontaneously. After drying the yield is 1.042 g. having M.P. 184°–186° C. (K).

Recrystallisation from ethyl acetate gives pure 3β-pyrrolidinyl-androst-4-ene-17β-ol (I*y*) M.P. (K) 196°–203° C. (slight decomp.); $[\alpha]_D^{19} = +23°$ (c.=1% in chloroform).

EXAMPLE 8

Preparation of 3β-pyrrolidinyl-pregn-4-ene-20 - one (I*e*) via the "enamine" pyrrolidinyl derivative of progesterone A three-necked flask is fitted with a tube for introducing nitrogen, and in the flask is prepared a benzene (100 ml.) solution of 18.35 g. of the pyrrolidinyl "enamine" of progesterone (M.P. 192°–194° C. (K)). This compound is obtained by the action of pyrrolidine on progesterone in solution in methanol as described by Heyl & Herr (J. Am. Chem. Soc. 1956, volume 78, page 434).

2.5 ml. of formic acid are added drop by drop, to this solution. A vigorous reaction ensues. The mixture is then heated for 30 minutes under reflux. After cooling, a further 2.5 ml. of formic acid is added, and then the mixture is evaporated to dryness in vacuo. The brown paste obtained is dissolved in water, and the solution is thrice extracted to remove neutral compounds, consisting of slightly impure progesterone (weight 1.06 g.).

The aqueous solution is then made alkaline with sodium carbonate; a voluminous white precipitate of amine is formed. A little ether is added and the liquid filtered. The greater part of the amine, which is only slightly soluble in this solvent collects upon the filter while the filtered ether solution, separated from the aqueous phase by decantation yields, on evaporation, a further crop of crystals, the purity of which is substantially the same as that of the first crop. Total weight after drying 11.856 g., M.P. (K) 128°–134° C.

An analytically pure specimen of 3β-pyrrolidinyl-pregn-4-ene-20-one (Ie) obtained by recrystallisation of the preceding product from ethyl acetate had M.P. (K) 136°–138° C., $[\alpha]_D^{24.5°} = +81.7$ (c.=1.0% in dioxane), $[\alpha]_D^{28°} = +99.6°$ (c.=1.0% in chloroform).

The above amino-ketone has been characterised by the following crystalline derivatives:

(a) methiodide, $C_{26}H_{42}ONI$, formed by reaction with methyl iodide M.P. (K)=237°–242° C. (decomp.)

(b) the corresponding alcohol (ρ), 3β-pregn-4-ene-20β-ol (Iad), obtained by the action of lithium aluminum iodide, followed by recrystallisation from ethyl acetate, M.P. (K) 174°–177° C. $[\alpha]_D^{23.5°} = +10.9°$ (c.=1.0% in dioxane).

EXAMPLE 9

Preparation of 3β - pyrrolidinyl-21-hydroxy-pregn-4-ene-20-one (Iag) via the pyrrolidinyl enamine derivative of desoxy corticosterone (a) Preparation of the intermediate enamine, a new compound, by the action of pyrrolidine either on desoxy corticosterone (IIf) or on its acetate (IIi).

15 g. of desoxy corticosterone acetate are dissolved in 100 cc. of methanol. Then, whilst passing a stream of dry nitrogen, 6 ml. of pyrrolidine is added all at once. The mxiture is boiled for 8 minutes and then allowed to cool under an atmosphere of nitrogen. The "enamine" or 3-pyrrolidinyl-21-hydroxy - pregn - 3,5 - diene-20-one crysallises out. It is filtered off, sucred dry and then dried. Yield: 13.343 g. M.P. (K) 163°–165° C.

$$[\alpha]_D^{23} = -78.4°$$

(c.=1.0% in chloroform).

(b) Formic acid reduction of the enamine.

13.971 g. of the "enamine" prepared as described above are dissolved in 35 ml. of boiling dry benzene. The solution is partly cooled and 2.1 ml. of formic acid added. Bubbles of gas are evolved and the mixture becomes orange-coloured. Two layers form, then the colour becomes paler and the mixture becomes homogeneous.

It is then boiled for 55 minutes under reflux and the benzene removed in vacuo. The residue crystallises spontaneously.

Recrystallisation from ethyl acetate gives 3β-pyrrolidinyl-21-hydroxy-pregn-4-ene-20-one (Iag), M.P. (K): 174°–182° C. yield 8.510 g. Further recrystallisation from methanol raises the M.P. to 184°–186° C. (K) $[\alpha]_D^{23°} = +89.5°$ (c.=1.0% in chloroform).

This hydroxy-amino ketone has been characterised thus:

(a) by its acetate, or 3β-pyrrolidinyl-21-acetoxy-pregn-4-ene-20-one (Ial), made by the action of acetic anhydride in the cold and recrystallisation from ether; M.P. (K) 113°–118° C.;

(b) by preparation of the diol: 3β-pyrrolidinyl-pregn-4-ene-20β, 21 diol (Iat), by reduction with sodium borohydride, followed by recrystallisation from methanol; M.P. (K) 210°–212° C.

EXAMPLE 10

Preparation of 3α - pyrrolidinyl - 5β - pregnane - 20 - one (Ib).

A flask, fitted with a Soxhlet apparatus containing a thimble filled with calcium carbide, and containing 6 g. of 5β-pregnane-3,20-dione (IIc; M.P. 112°–114°) and 600 cc. dry benzene is heated to reflux. After 2 hours, 6.5 ml. pyrrolidine is added all at once and the mixture boiled overnight. The Soxhlet apparatus is then removed and 10 ml. of formic acid added all at once. There is a copious evolution of fumes, and two layers are formed. A current of nitrogen is passed through the still hot solution, which latter is mechanically stirred for one hour. The mixture is then concentrated in vacuo on a water bath, to a quarter of its initial volume, then diluted with 250 ml. of water and the neutral material extracted with ether. The aqueous layer is then made alkaline with a 20% solution of sodium carbonate. The free sterol amine is extracted with benzene, the benzene solution washed with water and dried over sodium sulphate. After filtering and then evaporating in vacuo, there remains an oily residue (yield 6.7 g.) which crystallises spontaneously. The 3α-pyrrolidinyl-5β-pregnane-20β-one (Ib) is purified by recrystallisation from 25 ml. of petroleum ether, weight=3 g. (yield 43%); M.P. (K) 116°–118° C.

An analytical sample is obtained after a further crystallisation from petrol ether. The melting point is unchanged.

The presence of the keto group in the above ketone is shown by reduction with sodium borohydride. There is thus obtained 3α-pyrrolidinyl-5β-pregnane-20β-ol (Iac); after recrystallisation from petroleum ether M.P. 152°–156° C. (double M.P.).

EXAMPLE 11

Preparation of 3β-pyrrolidinyl-5α-pregnane-20-one (Ic)

The procedure is exactly as in Example 10, using as starting material allopregnadione (IIb), and the intermediate enamine is not isolated. After recrystallisation from ethyl acetate the 3β-pyrrolidinyl-5α-pregnane-20 one (Ic) melts at 128°–130° C. (K).

EXAMPLE 12

Preparation of 3α - pyrrolidinyl - 21 - hydroxy - 5β - pregnane-20-one (Iaf).

(A) Via the pyrrolidinyl "enamine" of 21-hydroxy-5β-pregnane-3,20-dione, a new compound.

5 g. of 21-hydroxy-5β-pregnane-3,20-dione (IIg) is dissolved in 50 ml. of boiling methanol contained in a 250 cc. flask having a ground glass neck. The solution is cooled to room temperature, and 1.5 ml. of pyrrolidine is added, whilst a current of dry nitrogen to the super saturated solution thus obtained. The temperature is kept down by cooling with water. After some minutes, the enamine crystallises out from the solution, which has become a straw yellow colour. The mixture is evaporated at 0.01 mn. of mercury, cooling being avoided by placing the reaction flask in a bath of cold water when the methanol does not come off. The white crystalline residue obtained is 3-pyrrolidinyl-21-hydroxy-5βH-pregn-3-ene-20-one, analytically pure, M.P. (K) 148°–153° C. (decomp.)

This "enamine" is dissolved in 50 ml. of cold dry benzene. Then 1.5 ml. of formic acid is added, very slowly, whilst maintaining an atmosphere of nitrogen and with mechanical stirring. Two layers are formed. After stirring for 20 minutes at room temperature, the aqueous layer becomes opaque. After 1 hour, a further 1 ml. of formic acid is added, and the two layers form again. Finally the mixture is warmed at 60–65° C. for 5 minutes, then allowed to return to the temperature of the laboratory, diluted with water, the phases separated and the aqueous layer extracted with ether, in order to remove neutral compounds. The aqueous layer is then made alkaline with an aqueous 20% sodium carbonate solution. The free amine crystallises. After allowing to stand it is dried, then washed with water and again dried. The crude 3α - pyrrolidinyl - 21 - hydroxy - 5β - pregnane - 20 - one (Iaf) weighs 4.65 g. and melts at 142°–148° C. A single recrystallisation from boiling ethyl acetate gives it pure for analysis: weight 2.47 g. M.P. (K) 157°–159° C. $[\alpha]_D^{25.5°} = +94.4°$ (c.=1.0% in chloroform). A further crystallisation from methanol did not alter these constants.

In another experiment the yields were better, (less neutral compounds were isolated), as a result of a slightly longer heating time during the formic acid reduction of the enamine.

The above hydroxyamino ketone (Iaf) has been characterised by the following derivatives:

(a) Acid fumarate of Iaf, prepared in solution in isopropyl alcohol and recrystallised from water: M.P. (K) 177°–181° C.

(b) Monocitrate of Iaf, prepared in solution in a ethyl acetate and recrystallised from n-propanol: M.P. (K) 164°–168° C. $[\alpha]_D^{24.5°} = +72.5°$ (concentration: 1% in methanol).

(c) Acetyl derivatives: 3α-pyrrolidinyl-21-acetoxy-5β-pregnane-20-one (Iak) made by acetylation in pyridine and recrystallisation from ethyl acetate. M.P. (K): 132°–133° C. (decomp.).

(d) Picrate of the acetyl derivative, $C_{33}H_{46}H_{10}N_4$ small yellow tufts, recrystallised from ethanol: M.P. (K) 215–216° C.

(e) The 20β, 21-diol, or 3α-pyrrolidinyl-5β-pregnane-20β,21-diol (Ias), obtained by reduction with sodium borohydride of the hydroxyamino ketone Iaf, and identical with the product of Example 3 made by the Leuckart reaction: M.P. (K) 254°–256° C. (with ultimate decomposition) after recrystallisation from methanol.

(B) The compound Iaf, 3α-pyrrolidinyl-21-hydroxy-5β-pregnane-20-one, is equally well prepared in good yield by following the procedure described under Example 10, but using as starting material hydrodesoxycorticosterone (IIg) and purifying the free amine as set forth under (A) above.

The second method which can be employed for preparation of amino-steroids of the general Formulae I is treating a mixture of a ketone having the general Formula II and an amine, in an inert diluent, with hydrogen in the presence of suitable hydrogenating catalysts.

Amines of various kinds can be used, more especially ammonia, the lower aliphatic primary and secondary amines, saturated cyclic amines such as pyrrolidine, morpholine, piperidine, the N-alkyl piperazines, and araliphatic amines such as benzylamine.

In general, the amine (ammonia is here considered to be an amine) as used in excess with respect to the 3-keto steroid being treated. When using non-volatile amines, a slight excess, up to 10% is adequate. When using volatile amines including ammonia, the excess can be rather more.

A catalyst which can suitably be used is, in the first place, palladium, preferably on a support, especially carbon black; for example 5% of palladium upon carbon black is quite suitable. Platinum can also be used, particularly in the form of the oxide. This too may be upon a support, such as carbon black. Raney nickel may also be used.

The 3-keto steroid, amine, and catalyst are preferably placed in a diluent which is inert under the conditions of carrying out the hydrogenation. The usual solvents employed for catalytic hydrogenations can be used. Lower aliphatic alcohols, which need not be completely anhydrous, are especially suitable. However, other organic solvents, for example ethyl acetate, ether, or dioxane, may be used. The quantity of diluent employed is not critical for successful working, and the choice thereof is dictated primarily by convenience. Generally from 5 to 50 parts by weight of diluent are used per part of 3-keto steroid, but such limits are not mandatory.

The hydrogenation can usually be carried out successfully without applying pressure, but it can nevertheless be carried out in equipment designed for maintaining a super atmospheric pressure, preferably below 10 kg./cm.², of hydrogen. Usually the process is carried out at temperatures below the boiling point of the diluent, preferably from 0° to 65° C. and most frequently at the temperature of the laboratory. Nevertheless in some cases it may be advantageous to cool in order to work below room temperature, and in other cases, to heat. As a rule the hydrogenation can be continued until hydrogen ceases to be absorbed or until the calculated amount has been absorbed, taking into account in certain cases what may be required to saturate any double bonds, or, if it be desired, to effect or avoid hydrogenolysis (for example, to remove the benzyl group in the case of benzylamine). Taking into account these requirements the reaction time may vary from several hours to several days.

Under the mild hydrogenation conditions envisaged above one can largely or wholly avoid the reduction of carbonyl groups, other than that at position 3, which may be present in the 3-keto-steroid employed as starting material.

In many cases only the 3β isomer can be isolated from the hydrogenation product by crystallisation to the exclusion of any other isomer.

When the amine used is benzylamine, it has been found that if the hydrogenation is not stopped when the requisite amount of hydrogen required to produce the 3-benzylamine compound has been absorbed, the absorption continues, particularly when working above room temperature. Hydrogenolysis, accompanied by fission of the benzylamino group and formation of the corresponding primary amine, then occurs.

The invention includes such mode of carrying it into effect, that is to say, in the case of benzylamine, hydrogenation carried to the stage of hydrogenolysis. This enables the ready production of the corresponding primary amines, especially those having a primary amino group having the β configuration.

Certain primary amines are difficult to isolate as the free base, perhaps by reason of a condensation between the NH₂ group and a CO group, so long as another is present in the molecule.

The applicants have found that it is particularly convenient, in order to isolate the primary amine in a pure state and in good yield, to cause it to react with an appropriate aldehyde in order to convert it into a Schiff's base, so long as it is easy subsequently to regenerate the primary amine from that base. Benzaldehyde is very convenient for this purpose. Regeneration of the primary amine can be effected either by hydrogenating the Schiff's base, or by hydrolysis with a mineral acid. This method of producing and purifying the primary amine is, in fact, a valuable means of preparing it, although it can also be prepared directly, using ammonia and hydrogen, although the difficulties of isolating and purifying it are then greater. These difficulties are less in evidence when in the case of unsaturated 3-keto steroids, such as progesterone, the starting materials are the corresponding reduced compounds, such as pregnanedione.

The following examples illustrate the second procedure for synthesis of aminated steroids of type I (catalytic reductive amination). The references such as Ia, IIa, refer to the formulae and tables given above.

EXAMPLE 13

3β- and 3α-pyrrolidinyl-5α-pregnane-20-ones (Ic and Id)

There are charged into an apparatus for catalytic hydrogenation at ordinary pressure, fitted with an electromagnetic stirrer:

3.15 g. (0.01 mol) of 5α-pregnane-3,20-dione (IIb) M.P. 117–119° C.), 0.9 ml. of pyrrolidine (0.011 ml.), 105 ml. of absolute alcohol and 0.3 g. of palladium supported on charcoal and containing 5% palladium. The mixture is hydrogenated at room temperature. After about an hour the theoretical amount of hydrogen (224 ml.) is taken up. The catalyst is then filtered off, the filtrate evaporated to dryness, the residue taken up in petroleum ether and allowed to crystallise. 1.5 g. of a white product, M.P. 120°–125° C. (tube) is obtained which is recrystallised from petroleum ether. It is 3β-pyrrolidinyl-5α-pregnane-20-one (Ic) M.P. 127°–129° C. (tube)

$$[\alpha]_D^{24.5°} = +83.5°$$

(concentration=1% in chloroform). The melting point is not depressed when mixed with the base made by the formic acid reduction of the pyrrolidinyl enamine prepared from 5α-pregnane-3, 20-dione (see Example 11). It has an infrared spectrum which is identical with that of this latter base (determined in solution in carbon disulphide). When added to an aqueous solution of furmaric acid, the base gives a hydrogen furmarate, which is recrystallised from water: white crystals, M.P. 72°–75° C. (tube).

The petroleum ether mother liquors remaining after isolating the 3β-amine are evaporated to dryness. The residue is dissolved in alcohol and 1 g. of furmaric acid is added to the solution. The fumarate formed is precipitated by adding ether plus petroleum ether. It is filtered off and recrystallised, firstly from isopropanol and then from water, giving 0.3 g. of the hydrogen fumarate $C_{25}H_{41}ON$, $C_4H_4O_4$, M.P. (tube) 209°–212° C.

The corresponding base is liberated from this fumarate by means of ammonia. After extracting with ether, washing the ether solutions with, drying them over sodium sulphate, filtering and evaporating the solvent, the regenerated amine is recrystallised from methanol. It is 3α-pyrrolidinyl-5α-pregnane-20-one (Id), M.P. (tube): 102°–104° C. $[\alpha]_D^{24} = +82.6°$ (concentration 0.5% in chloroform).

EXAMPLE 14

3β- and 3α-pyrrolidinyl-5β-pregnane-20-ones (Ia and Ib)

(a) Starting from 5β-pregnane-3,20 dione (IIc):

The process is carried out exactly as with the 5α-H derivative, using 3.15 g. (0.01 mol.) of 5β-pregnane-3,20-dione (IIc), but instead of evaporating to dryness after filtering off the catalyst, the filtrate is concentrated to 25 cm.³ and allowed to crystallise. On cooling there is obtained a first crop of 3β-pyrrolidinyl-5β-pregnane-20-one (Ia), white crystals, M.P. (tube) 132°–133° C. (yield 1.35 g.). After filtering concentration of the mother liquors affords 0.15 g. of the same product, M.P. (tube) 131°–132° C. $[\alpha]_D^{25.5} = +98.1°$ (concentration 1% in chloroform).

Addition of fumaric acid to a solution of this base in anhydrous acetone gives a hydrogen fumarate. The latter is recrystallised from anhydrous acetone M.P. 198°–201° C. (tube).

The alcoholic mother liquors after isolating the 3β-pyrrolidinyl-5β-pregnane-20-one are treated with fumaric acid to obtain the salt. The fumarate is precipitated by a mixture of ether and petrol ether. The crystals obtained are filtered off and recrystallised from acetone and then from water, affording 0.7 g. of fumerate (M.P. (tube) 172°–174° C.). The base is liberated from the latter by using ammonia, as described in Example 13 and the regenerated amine recrystallised from petrol ether. This gives 0.3 g. of a compound (M.P. 116°–118° C. (tube)) which shows an unchanged mixed melting point with 3α-pyrrolidinyl-5β-pregnane-3,20-dione, Ib, made as described in Example 10. The infrared spectra, determined in carbon disulphide, are superimposable.

(b) Starting from progesterone (IIa):

The following are charged into a hydrogenation apparatus for use at atmospheric pressure which is fitted with an electromagnetic stirrer—

5.2 g. of progesterone (IIa), 175 ml. of absolute alcohol, 1.5 cm.³ pyrrolidine and 0.5 g. of 5% palladium supported upon charcoal. The theoretical amount of hydrogen is absorbed in 20 minutes at room temperature.

The product is filtered, the filtrate evaporated to dryness, the residue is dissolved in 20 ml. of ethanol and allowed to crystallise slowly. In this way there is obtained 2.65 g. of a white product (M.P. 128°–133° C. (tube)), which after recrystallisation from ethanol, melts at 132°–133° C. (tube) and shows no depression of melting point with 3β-pyrrolidinyl-5β-pregnane-20-one, made by process (a). Furthermore the infrared spectra as determined in carbon disulphide, are superimposable.

EXAMPLE 15

3β-dimethylamine-5β-pregnane-20-one (If)

The reaction mixture consists of: 0.00 33 mol (1.05 g.) of 5β-pregnane-3,20-dione (IIc), 30 ml. of absolute alcohol, 5 ml. of a 20% alcoholic solution of dimethylamine, and 0.1 g. of 5% palladium supported upon charcoal. Hydrogenation is carried out at ordinary pressure and 40°–45° C. using an electromagnetic heating stirrer. Reaction takes place very slowly (5 to 6 hours). When it is finished (after 74 cm.³ of hydrogen have been absorbed) the catalyst is removed by filtration, the filtrate evaporated to dryness, the residue taken up in absolute alcohol and 0.4 g. of fumaric acid added. The fumarate formed is filtered off and recrystallised from alcohol; yield 0.6 g. It is the acid fumarate of 3β-dimethylamino-5β-pregnane-20-one, M.P. (tube) 212°–214° C.

$$[\alpha]_D^{24.5°} = +72.1°$$

(concentration 1% in methanol).

The free base is obtained from the hydrogen fumarate in the usual way and melts at 96–97° C. (tube). Examination of the infrared spectrum of this amine as determined in carbon disulphide solution, shows the presence of bands characteristic of 20-ketones, with a normal $C_5$ configuration (R. Norman Jones and coworkers. J. Amer. Chem. Soc., 1955, volume 77, page 651) with an axially (or β) disposed tertiary amino group at position 3 (triplet in the region 7.2–7.6μ and absorption at 11.60μ with a minimum at 11.40μ).

EXAMPLE 16

3β-piperidinyl-5β-pregnane-20-one (Ig)

The reaction mixture comprises: 5β-pregnane-3,20-dione (IIc; 0.02 mol), dry piperidine (2.4 ml., 0.022 mol), 5% palladium supported upon charcoal (0.1 g.) and absolute alcohol (50 ml.). This is hydrogenated at ordinary pressure and 50° C. making use of an electromagnetic stirrer which heats. The reaction is very slow: it requires more than 24 hours for completion. After filtration and concentration, the 3β-piperidinyl-5β-pregnane-20-one (Ig) crystallises; yield=3.60 g., M.P. (tube): 116°–119° C. After recrystallisation from absolute alcohol it melts at 121°–122° C. (tube). $[\alpha]_D^{27°} = +94.2°$ (concentration=1% in chloroform).

EXAMPLE 17

3β- and 3α-morpholinyl-5β-pregnane-20-one (Ih and Ii)

Hydrogenation is carried out exactly as in Example 16, but the piperidine is replaced by 1.9 g. (0.022 mol) of dry morpholine. Absorption is even slower. After 34 hours, only 328 cm.³ of the 448 cm.³ of hydrogen theoretically required have been absorbed. So after filtering and evaporating the filtrate to dryness in vacuo, the residual oil is itself dissolved in 5 ml. of acetic acid and 250 ml. of water are then added. The amines remain in solution as salts, and the non-basic products (2.4 g.) can be extracted with ether. The aqueous solution of amine acetates is then made alkaline and the free bases are extracted with ether. The ethereal extract is washed with water and dried over sodium sulphate. After filtering and evaporating to dryness, the colourless oil obtained (yield 5.2 g.) is taken up in petroleum ether and left to crystallise slowly to give 3.4 g. of a white product M.P. (K) 142°–144° C. which is recrystallised from petroleum ether. It is 3β-morpholinyl-5β-pregnane-20-one (Ih), M.P. (tube)=144°–145° C. $[\alpha]_D^{25°}=+89.7°$ (concentration=1% in chloroform).

The petrol ether mother liquors are taken down to dryness and the residue thus obtained (1.6 g.) is made acid with a solution of 0.5 g. fumaric acid dissolved in 4.5 cm.$^3$ of isopropanol. This affords a gelatinous fumarate, which is repeatedly crystallised from acetone. Finally there is obtained 1.0 g. of white crystals, M.P. (tube) 164°–166° C. (decomp.). This fumarate is decomposed with ammonia and the free base, worked up in the usual way, is recrystallised from light petroleum ether. It is 3α-morpholinyl-5β-pregnane-20-one (Ii), M.P. (tube) 136°–137°, $[\alpha]_D^{27}=+103°$ (concentration=1% in chloroform).

EXAMPLE 18

3β- and 3α-(4-methyl-1-piperazinyl)-5β-pregnane-20-ones (Ij and Ik)

These amines are prepared in the same way as the corresponding morpholine derivatives, but using 2.2 g. of N-methylpiperazine in place of the morpholine. In this case also the absorption of hydrogen is very slow: even after 54 hours the theoretical amount of hydrogen has not been taken up. The basic fraction obtained yields, in petroleum ether, 3.1 g. of white crystals, having a double melting point: 159–160° C. and 166–167° C. (tube). It is 3β-(4-methyl-1-piperazinyl)-5β-pregnane-20-one (Ij). The specimen of constant melting point is recrystallised from petroleum ether; double melting point (tube) 162–164° C. and 168–169° C. $[\alpha]_D^{25}=+90.6°$ (1% concentration in chloroform).

The mother liquors are taken down to dryness, and the residue, after solution in acetone, is converted into a salt by addition of a methanol solution of fumaric acid. The fumarate which precipitates is recrystallised from 95% alcohol. The base is liberated from this fumarate (1.70 g., M.P. (K)>270° C.) with ammonia, and it is then worked up in the usual way. It is 3α-(4-methyl-1-piperazinyl)-5β-pregnane-20-one (Ih), M.P. (tube) 147°–149° C. (from light petroleum ether); $[\alpha]_D^{26}=+83.5°$ (concentration: 1% in chloroform).

EXAMPLE 19

3β-methylamine-5β-pregnane-20-one (Il) 6.3 g. (0.02 mole) of 5β-pregnane-3,20-dione (IIc) is dissolved in 120 ml. of absolute alcohol. Then 30 ml. of a 20% by weight solution of methylamine in absolute alcohol are added, together with 0.1 g. of 5% palladium supported upon charcoal. The theoretical amount of hydrogen is absorbed after 8½ hours, working at 50° C. and using an electromagnetic heating stirrer. The mixture is then filtered, the filtrate evaporated to dryness and the residue recrystallised from di-isopropyl ether and then from methanol. The crystals thus obtained do not have a sharp melting point, and they are then distilled from an oil bath; B.P. at 0.05 mm. of mercury 215° C. (bath temperature). It is 3β-methylamino-5β-pregnane-20-one (Il) M.P. (tube) 81°–82° C.

EXAMPLE 20

3β-benzylamino-5β-pregnane-20-one (Im)

(a) Using a palladium catalyst: The following mixture is introduced into apparatus fitted with an electromagnetic stirrer for carrying out hydrogenation at ordinary pressure; 25.2 g. of progesterone (0.08 mol), 9.6 gm. of benzylamine (0.088 mol), 200 ml. of absolute alcohol and 2.4 g. of 5% palladium supported upon charcoal. After 9 hours at room temperature 3,900 cm.$^3$ hydrogen is absorbed.

A white product crystallises out and is deposited on the catalyst. The mixture is filtered and the mass of catalyst is extracted with chloroform or hot benzene. On evaporation of the solvent 3β-benzylamino-5β-pregnane 20-one crystallises out (yield 21 g.: yield 64.3%). After a single recrystallisation from ethanol the M.P. is constant at 138°–140° C. (tube), yield 16.1 g. (very nearly 50%), $[\alpha]_D^{26°}=+85.1°$ (concentration 1% in chloroform). The infrared spectrum (determined in carbon disulphide solution) shows the normal 20-keto group of the series and a monosubstituted aromatic ring.

(b) Using a platinum oxide catalyst: 6.3 g. (0.02 mol) of progesterone, 0.63 g. of platinum oxide (Baker Ltd.), 1.2 g. of purified animal charcoal, 2.45 ml. of benzylamine and 50 ml. of absolute alcohol are hydrogenated at room temperature using electromagnetic stirring. When two equivalents of hydrogen have been absorbed (in 4½ hours), a product crystallises out from the reaction mixture, but absorption continues at an appreciable rate. The reaction is stopped after 22 hours and the reaction mixture filtered. Then, after adding ammonia so that colloidal platinum does not pass into the filtrate, the steroid retained by the filter together with the catalyst, is extracted with chloroform. The chloroform solutions are then evaporated in vacuo to dryness (4.83 g.). The dry residue is recrystallised from absolute alcohol. The material thus obtained melts at 136°–139° C. (K) and does not show any depression of melting point when admixed with 3β-benzylamino-5β-pregnane-20-one obtained as described under (a) above. Furthermore the infrared spectra are substantially superimposable, although certain differences in the region from 8 to 9μ lead one to suspect that isomers with a 5-α-H configuration are present in appreciable amounts.

(c) With Raney nickel catalyst: A mixture of progesterone (6.3 g.; 0.02 mol) freshly-prepared Raney nickel (3 g.), benzylamine (2.45 ml.) and 50 ml. of absolute alcohol is hydrogenated in a shaking apparatus. Absorption of gas is rather slow: about 15 hours are needed for the steroid to take up two equivalents of hydrogen. The latter crystallises out in the reaction mixture. The steroid precipitated along with the catalyst is extracted with chloroform. After evaporation in vacuo, the residue is dried and then weighs 5.1 g. It is recrystallised from absolute alcohol: M.P. (K) 136°–138° C. shows no depression of melting point on admixture with the product prepared according to (a).

From the mother liquors 0.26 g. of a product M.P. (K) >250° C. can be recovered.

EXAMPLE 21

3β-amino-5β-pregnane-20-one (Io) and derivatives thereof (a) Via the derivative Is containing a benzylidene group:

Into an apparatus for hydrogenation at ordinary pressure, fitted with an electromagnetic stirrer which heats, there is introduced—

6.3 g. of 5β-pregnane-3,20-dione (0.02 mol, IIc), 80 ml. of absolute alcohol, 2.4 g. (0.022 mol) of redistilled benzylamine and 0.6 g. of 5% palladium supported upon charcoal. Throughout the entire hydrogenation (5 hours) the mixture is heated to 50° C. and slightly more than two equivalents of hydrogen (1,020 cm.$^3$ compared with the theoretical quantity of 896 cm.$^3$) are absorbed. The mixture is filtered and 2.4 g. (0.022 mol.), of benzaldehyde is added to the filtrate. The whole is then concentrated at raised temperature until crystallisation begins: this gives 5.4 g. of the benzylidene derivative Is. M.P. (tube) 188°–190° C.

A specimen of the compound Is, 3β-benzylidene amino-5β pregnane-20-one, is recrystallised from ethyl acetate M.P. (tube) 197°–198° C.

The crude benzylidene derivative, Is, is catalytically hydrogenated under conditions identical with those described above, in the presence of 5% palladium supported upon charcoal and 150 ml. of absolute ethanol. After 2.5 hours it has absorbed substantially the quantity of hydrogen required to split the regenerated benzylamine derivative. The product is filtered, the filtrate evaporated to dryness in vacuo, and the residue dissolved in boiling petroleum ether and then left to crystallise slowly. In this way there is obtained 2.0 g. of large colourless crystals, M.P. (tube) 120°–122° C. while from the mother liquor there is recovered a further 1.2 g. of product. M.P. (tube) 95°–105° C., but undergoing change when attempt is made to purify it by recrystallisation. The product M.P. 120°–122° C. has $[\alpha]_D^{26°} = +98.4°$ (concentration= 1% in chloroform). The infrared spectrum, determined in petrolatum has little or no absorption in the region 6.25 to 6.30μ, unlike 3α-amino steroids. But it has a very sharp absorption in the region of 14.70μ.

The N-acetyl derivative of this amine is obtained in quantitative yield by the action of acetic anhydride on the free base. This affords white crystals, Ir which after recrystallisation from di-isopropyl ether has M.P. (tube) 127°–128° C. $[\alpha]_D^{26.5°} = +90.7°$ (concentration 1% in ethanol).

(b) Via the acid fumarate:

To 5.15 g. of pregnanedione IIc are added 165 ml. of absolute alcohol, 3 g. of benzylamine and 0.5 g. of 5% palladium supported upon charcoal. Hydrogenation is carried out at 40–43° C. and continued until an amount of gas sufficient to effect hydrogenolysis of the intermediate benzylamine derivative Im, has been absorbed. The product is filtered and the primary amine separated as the acid fumarate, yield 2.4 g. M.P. (tube): 176°–178° C. It is very difficult to purify. By the action of ammonia upon this fumarate the free base is obtained and is extracted with cyclohexane. The cyclohexane solutions are washed with water and dried over sodium sulphate. Evaporation yields the amino steroid, which is repeatedly recrystallised from petroleum ether. This purification is accompanied by copious resinification and large losses. It has not been possible to raise the melting point of the 3β-amino-5β-pregnene-20-one (Io) above 112°–114° C. (tube).

(c) By hydrogenolysis of the purified benzylamino derivative Im, the latter being prepared from progesterone (see above) 16.1 g. of purified 3-benzylamino-5β-pregnane-20-one, M.P. 138°–140° C. (tube) made by reductive catalytic amination of 25.2 g. of progesterone in the presence of palladium (see above), are suspended in 200 ml. of absolute alcohol and stirred electromagnetically in an atmosphere of hydrogen at ordinary pressure and 50° C. in the presence of 1.6 g. of 5% palladium supported on charcoal. Hydrogenolysis is practically complete after 4 hours, when the theoretical amount of hydrogen (900 ml.) has been absorbed. The catalyst is removed by filtration and the alcohol taken up in vacuo at 50° C. The residue is dissolved in 40 ml. of boiling petroleum ether. The solution is allowed to crystallise slowly to give, after drying, 11.0 g. of 3β-amino-5β-pregnane-20-one, Io. M.P. 118°–120° C. (tube). The melting point is not depressed when admixed with the product obtained by method (a). The yield is 74% (or 37% based on the progesterone).

In an analogous experiment the amine was isolated as the acid maleate, by adding a concentrated ethanol solution of maleic acid to the filtered crude hydrogenolysis product. Recrystallisation from water gave the analytically pure salt. M.P. (tube) 184°–186° C., $[\alpha]_D^{25°} = +71.9°$ (concentration=1% in 96% alcohol).

(d) Preparation of the "ascorbate" of 3β-amino-5β-pregnane-20-one, Io by hydrogenolysis of the purified benzylamine derivative (Im), the latter being made from progesterone (see above).

20.0 g. of purified 3β-benzylamino-5β-pregnane-20-one (Im). M.P. 138°–140° C. (tube), are suspended in 200 ml. of isopropanol and stirred electromagnetically at 50° C. in hydrogen at ordinary pressure, and in the presence of 2 g. of 5% palladium supported upon charcoal. Hydrogenolysis is practically complete after 5 hours (1120 ml. hydrogen is absorbed). The catalyst is removed by filtration. The filtrate is heated to boiling, under an atmosphere of nitrogen and a boiling solution of ascorbic acid (10 g.) in methanol (75 ml.) added.

The methanol is evaporated and the "ascorbate" crystallises. After cooling, the white crystals are filtered off and sucked dry. They are dried in a high vacuum. The yield obtained 20.8 g., is equal to 86% based on the benzylamine derivative, Im, and 43% based on the progesterone. M.P. (tube) 179°–181° C., $$[\alpha]_D^{25°} = +106.7°$$

(concentration: 0.5% in water).

This "ascorbate" is one of the few salts of base Io which is readily soluble in water.

(e) By attempted hydrogenolysis of the anisylidene derivative (Iv). Isolation of 3β-(methoxy-phenylmethyl-amino)-5β-pregnane-20-one (Ix).

A mixture of 5β-pregnane-3,20-dione (II c; 6.3 g.) and benzylamine (2.4 g.) is hydrogenated as described above under (a). The crude primary amine formed by hydrogenolysis is condensed with anisaldehyde (4.4 g.), by heating for 1 hour under reflux in the presence of alcohol. After concentrating to 150 ml., 6.3 g. of Schiff's base containing an anisylidene group (Iv) is isolated by crystallisation. M.P. (tube): 175°–177° C. Analytically pure imine is obtained by recrystallisation from ethyl acetate, M.P. 179°–180° C. (tube).

2.2 g. of this derivative (Iv) is treated, in absolute alcohol at 50°–52° C. with hydrogen at ordinary pressure, in the presence of 5% of palladium supported upon charcoal (0.2 g.). Actually a single equivalent of hydrogen is absorbed (135 ml., whereas 226 ml. would be required for hydrogenolysis). After filtering off the catalyst, evaporation to dryness in vacuo and crystallisation from boiling petroleum ether, the secondary amine Ix is obtained M.P. (tube) 124°–125° C.

$$[\alpha]_D^{24.5°} = +81.7°$$

(concentration 1% in ethanol).

EXAMPLE 22

3β- and 3α-amino-5α-pregnane-20-ones (1q and 1A) and derivatives—Isolation of funtumine (a) Using benzylamine as a source of nitrogen;

The following are charged into a hydrogenation apparatus, fitted with an electromagnetic stirrer which heats:

6.3 g. of 5α-pregnane-3,20-dione (IIb; 0.02 mol), 80 ml. of absolute alcohol, 2.4 g. of benzylamine (0.022 mol), and 0.6 g. of 5% palladium supported upon charcoal. The mixture is stirred for 5 hours at 50° C. after which 960 ml. of hydrogen have been absorbed (896 ml. is theoretically required to bring about reduction and hydrogenolysis). The catalyst is filtered off, 2.4 g. of benzaldehyde (0.022 mol) is added to the filtrate, the mixture is concentrated to half its volume and then allowed to crystallise. In this way there are obtained 3.5 g. of 3β-benzylidene-amino-5α-pregnane-20-one (It) M.P. (tube) 195°–197° C. Recrystallised from ethyl acetate it weighed 2.5 g. and had M.P. 202°–204° C. (tube).

The benzylidene derivative (It) purified in this way is hydrogenated at ordinary pressure and 50° C. in 80 ml. of alcohol containing 0.2 g. 5% of palladium supported upon charcoal. In two hours the amount of hydrogen theoretically required to form the free amino group is absorbed. After filtering off the catalyst, the alcohol is evaporated in vacuo. The residue crystallises. By dissolving it in boiling cyclohexane and slowly evaporating pure 3β-amino-5α-pregnane-20-one (Iq) is obtained, M.P. (tube) 157°–158° C. weight 1.45 g., $[\alpha]_D^{25°} = +96.3°$ (concentration=1% in chloroform). The infrared spectrum, as determined in petrolatum exhibits bands characteristic of equatorial compounds.

From this base there was prepared an acid fumarate, M.P. (tube). 232°–234° C. after recrystallisation from methanol; and an imine I*w* by reaction with anisaldehyde (prepared in alcohol and recrystallised from ethyl acetate) M.P. (tube) 193°–194° C.

The several mother liquors obtained after separation of the benzylidene compound (I*t*), M.P. 202°–204° C. (and belonging to the 3β-amino series) are evaporated to dryness in vacuo. The residue obtained is dissolved in diisopropyl ether or di-ethyl ether and the solution treated overnight with dilute hydrochloric acid. In this way the imine is hydrolysed and a sparingly soluble amine hydrochloride is precipitated. It is purified by recrystallisation from a chloroform-acetone mixture. It is funtumine hydrochloride, or the hydrochloride of 3α-amino-5α-pregnane-20-one. M.P. (micr.) 260°–265° C. yield 1.4 g.

This hydrochloride or treatment with ammonia affords the base funtumine (IA) which dissolves in the ether. After decanting the separated ethereal extracts are washed with water and then dried over sodium sulphate. The ether is then removed in vacuo and the residual oil obtained crystallised from a mixture of ether and light petroleum (B.P. 35°–45° C.). In this way 1.1 g. of the base, M.P. (tube) 113°–117° C. is obtained.

The pure specimen for analysis of funtumine is obtained by another recrystallisation from ether-light petroleum ether. Its constants are practically identical with those of the product isolated by Janot and coworkers from *Funtumia latifolia* (Apocyanacae). It is 3α-amino-5α-pregnane-20-one (funtumine, IA) M.P. (tube) 120°–124° C. $[\alpha]_D^{23.5°}=+103.1°$ (concentration=1% in chloroform). The infrared spectrum as determined in petrolatum confirms this configuration.

By treating funtumine in alcoholic solution with benzaldehyde (30 minutes refluxing) an imine containing a benzylidene group is formed. It is crystallised from petroleum ether and then from methanol. It is 3α-benzylidene imino-5α-pregnane-20-one (I*u*), $[\alpha]_D^{26°}=+96.9°$ (concentration 1% in CHCl₃), M.P. 200–202° C. (tube). It gives a depressed mixed melting point with the isomeric 3β-benzylidene imino compound (I*t*) described above.

(b) With ammonia, NH₃, as a source of nitrogen:

An apparatus for hydrogenation at ordinary pressure fitted with electromagnetic stirrer which heats is charged with 6.3 g. of 5α-pregnane-3,20-dione (II*b*) 0.02 mol, dissolved in 100 ml. of absolute alcohol, 20 ml. of a 7% solution of gaseous ammonia in absolute alcohol, and 0.6 g. of 5% palladium supported upon charcoal. Absorption of hydrogen is slow: 11 hours are required for absorption of 480 ml. of gas, this quantity being slightly more than the theoretical amount (448 ml.). The catalyst is separated by filtration. It retains crystals of an organic product which are dissolved in chloroform, but there is no amine in the residue obtained on evaporating the chloroform. The bases formed in the reaction remain in solution in alcohol. This solution on evaporating to dryness in vacuo, gives a residue weighing 5.3 g., which is dissolved in the smallest amount of alcohol and then converted to a Schiff's base by reaction with benzaldehyde. The benzylidene derivative, which separates on rubbing the walls of the vessel, is isolated: weight 1.9 g., M.P. (K) 190°–192° C. It is recrystallised from ethyl acetate. The 3β-benzylamino-5α-pregnane-20-one thus prepared (I*t*) has M.P. (tube) 198°–201° C. It does not lower the M.P. 202°–204° C. (tube) of fused product obtained as described under (a) above.

EXAMPLE 23

3β-pyrrolidinyl-5α-androstane-17β-ol (I*z*)

5.8 g. of androstanolone (II*d*: .020 mol) and 1.8 ml. of pyrrolidine (0.022 mol) dissolved in 210 ml. of absolute ethanol are hydrogenated at ordinary temperature and pressure, in the presence of 0.6 g. of 5% palladium supported upon charcoal. The theoretical amount of hydrogen (450 ml.) is slowly absorbed. The catalyst is filtered off, the filtrate concentrated to 75 ml. and left to cool slowly. 3β-pyrrolidinyl-5α-androstane-17β-ol (I*z*) crystallises out, yield 4.3 g., M.P. 182°–184° C. (tube). It is obtained analytically pure by recrystallisation from ethyl acetate, M.P. (tube) 179°–182° C., $[\alpha]_D^{24°}=+8.8°$ (concentration: 1% in chloroform). The steric structure is settled by analogy.

EXAMPLE 24

3β-dimethylamino-5α-androstane-17β-ol (I*ab*)

This is prepared in the same way as the preceding derivative (I*z*). Upon replacing the pyrolidine by 30 ml. of a 20% alcoholic solution of dimethylamine.

A product of constant melting point (yield 2.2 g.) is obtained after two crystallisations from ethyl acetate M.P. (tube): 172°–174° C., $[\alpha]_D^{24°}=+8.8°$ (concentration: 1% in chloroform).

The methiodide of compound I*ab* is made by dissolving the base (1.5 g.) in absolute alcohol (15 ml.) and then adding an excess methyl iodide. The quaternary salt crystallises out spontaneously. The white crystals, which turn yellow in air, are filtered off, sucked dry and recrystallised from ethyl acetate. Yield 0.5 g. M.P. (K): 234°–

EXAMPLE 25

3β-pyrrolidinyl-5β-androstane-17β-ol (I*aa*)

2.9 g. of testosterone (0.01 mol) and 0.9 ml. of pyrrolidine (0.011 mol), dissolved in 50 ml. of absolute alcohol, are hydrogenated at ordinary temperature and pressure, using 0.15 m. of a 5% palladium catalyst supported upon charcoal.

After absorption of the theoretical amount of hydrogen (448 ml.), the mixture is filtered and concentrated. The 3β-pyrrolidinyl-5β-androstane-17β-ol formed is recrystallised from ethyl acetate. Yitld 0.5 g. M.P. (K): 234°–236° C., $[\alpha]_D^{24.5°}=+23.5°$ (concentration: 1% in chloroform).

EXAMPLE 26

21-hydroxy-3β-pyrrolidinyl-5β-pregnane-20-one (I*ae*)

The following are charged to a hydrogenation flask: 5.5 g. of hydrodesoxycorticosterone (II*g*), 150 ml. of absoute alcohol 1.5 ml. of pyrrolidine and 0.3 g. of 5% palladium supported upon charcoal. The mixture is stirred electromagnetically at ordinary temperature and pressure. After the theoretical amount of hydrogen (373 ml.) has been absorbed, the catalyst is filtered off and the filtrate evaporated to dryness in vacuo.

The crude 21-hydroxy-3β-pyrrolidinyl-5β-pregnane-20-one (I*ae*) yield 3.5 g., separates as white needles when recrystallised from diisopropyl ether M.P. 149°–151° C. (yield 2.2 g.). An analytically pure specimen melts at 152°–154° C. (tube) $[\alpha]_D^{24.5°}=+86.2°$ (concentration: 1% in chloroform).

It depresses the melting point of the 3α-isomer, which is obtained by the formic acid reduction of the pyrrolidine enamine of hydrodisoxycorticosterone (see Example 12) which has M.P. 157°–159° C. (I*af*).

EXAMPLE 27

3β-pyrrolidinyl-5β-pregnane-20β,21-diol (I*ar*)

The procedure of Example 26 is followed, but instead of hydrodesoxycorticosterone, 20β,21-dihydroxy-5β-pregnane-3-one (II*h*) is used.

Recrystallisation from diisopropyl ether gives 1.8 g. of 3β-pyrrolidinyl-5β-pregnane-20β,21-diol (I*ar*) M.P. (K) 188°–190° C., $[\alpha]_D^{27°}=+17.5°$ (concentration: 0.7% in chloroform).

EXAMPLE 28

21-acetoxy-3β-amino-5β-pregnane-20-one (I*am*) deriva-derivatives (a) From desoxycorticosterone acetate (II*i*) the following mixture is hydrogenated at ordinary pressure: 22.2 g. (0.06 mol) of desoxycorticosterone acetate (II*i*), 320 ml. of absolute alcohol, 7.2 g. of benzylamine (0.06 mol)

and 2.2 g. of 5% palladium supported upon charcoal.

After about 7 hours 0.12 mol (2830 ml.) of hydrogen is absorbed in effecting saturation of the double bond and reductive amination. The mixture is then heated to 50°–55° C. The absorption, which had slackened off very much, starts up again (hydrogenolysis of the intermediate benzylamino compound), and 0.06 mol of hydrogen is found to be absorbed in 5 hours. The catalyst is filtered off, 8 g. of benzaldehyde is added to the filtrate and the mixture is then concentrated to half its volume. The imine formed (I*ao*) is allowed to crystallise out. It is filtered off and recrystallised from absolute alcohol. Yield 15.0 g. M.P. (tube): 128°–131° C.

A further recrystallisation gives 21-acetoxy-3β-benzylideneamino-5β-pregnane-20-one (I*ao*) of constant melting point. The melting point is 132°–134° C. (tube).

$$[\alpha]_D^{23°} = +100°$$

(concentration: 1% in chloroform).

4.6 g. of the benzylidene derivative (I*ao*) M.P. (tube): 128°–131° C. is hydrogenated at ordinary pressure and 50° C. in the presence of 80 ml. of absolute alcohol and 0.5 g. of 5% palladium supported upon charcoal.

After the theoretical amount (448 ml.) of hydrogen has been absorbed (2 hours), the catalyst is filtered off, the alcohol removed by evaporation, and the residue taken up in ether. The latter is partially evaporated whereupon 0.9 g. of 21-acetoxy-3β-amino-5β-pregnane-20-one (I*am*) M.P. (tube) 163°–167° C. is obtained.

Purification by recrystallisation from ether or ethyl acetate is a delicate operation, since the product undergoes change. M.P. (tube) 176°–178° C., $[\alpha]_D^{23°} = +100.4°$ concentration=1% in chloroform).

The N-acetyl derivative of this amine is made by the action of acetic anhydride on the free base: the yield is quantitative. Recrystallisation from diisopropyl ether gives white crystals (I*an*), M.P. (tube) 129°–131° C.

$$[\alpha]_D^{29.5°} = +84.9°$$

(concentration=1% in chloroform).

Better yields of the free amine I*am* are obtained by precipitating it as the acid maleate after filtering off the catalyst. This is done by adding a solution of maleic acid in ethyl acetate. There is thus obtained 2.7 g. of the crystalline maleate (M.P. (tube) 171°–173° C.) which is purified by recrystallisation from cold water, M.P. (tube) 178°–180° C. $[\alpha]_D^{21.5°} = +80.2°$ (concentration 1% in chloroform)

(b) From hydrodesoxycorticosterone acetate (II*j*).

The method used above is followed using 3.75 g. of II*j* (0.01 mol) dissolved in 80 ml. of hot absolute alcohol, 1.2 g. of benzylamine and 0.44 g. of 5% palladium supported upon charcoal. After absorption of 0.02 mol of hydrogen, removal of the catalyst by filtration and addition of 1.5 g. of benzaldehyde, there is obtained 3.8 g. of the benzylidene derivative I*ao* M.P. (tube) 125°–127° C. identical with the product made by procedure (a).

EXAMPLE 29

Reductive amination, using benzylamine, of 20β,21-dihydroxy-5β-pregnane-30-one (II*h*)

1.5 g. of compound II*h* (M.P. (K) 160°–162° C.) is dissolved in 25 ml. of absolute alcohol, and 0.55 ml. benzylamine plus 0.15 gm. of 5% palladium supported upon charcoal. Hydrogenation is effected at 50° C. under ordinary pressure, using an electromagnetic stirrer which heats. Absorption of hydrogen is very slow and after 30 hours, only 115 ml. of hydrogen have been absorbed. To add the amount theoretically required for reductive amination and subsequent hydrogenolysis (200 ml.), fresh catalyst (0.15 g.) must be added and stirring continued at 50° for a further 12 hours. The mixture is filtered, the residue washed with boiling alcohol and the filtrate evaporated in vacuo. The residual oil is crystallised from ether weight 0.67 g. M.P. (K) 132°–136° C. Attempts at recrystallisation failed as the product was very unstable. This crude 3β-amino-5β-pregnane-20β-,21-diol (I*ax*) is dissolved in alcohol and heated for 1 hour on a boiling water bath with a slight excess of benzaldehyde. The solution obtained is concentrated: then, on rubbing the walls of the vessel, the benzylidene imine (I*ay*) crystallises. It is purified by solution in hot alcohol and then has M.P. (K) 156°–158° C. The substance thus obtained is still not analytically pure.

EXAMPLE 30

3ξ-pyrrolidinyl-17α,21-dihydroxy-5ξ-pregnane-11,20-dione (I*ai* and I*aj*)

4.8 g. cortisone (II*k*, 0.0132 mol) is dissolved in 140 ml. of absolute alcohol and 1.2 ml. of pyrrolidine and 0.30 g. of 5% palladium supported upon charcoal added. Hydrogenation is effected at ordinary temperature and pressure, 630 ml. hydrogen being absorbed (theoretical 584 ml.). The mixture is filtered and the filtrate concentrated in vacuo at 35° C. using a capillary tube bubbler connected to a source of dry nitrogen. The residue is dissolved in dry ether under an atmosphere of nitrogen. In this way 1.65 g. of a rather unstable crystalline product is obtained, M.P. (K) 208° C. It is recrystallised with difficulty from absolute ethanol: it is 3ξ-pyrrolidinyl-17α,21-dihydroxy-5ξ-pregnane-11,20-dione (I*aj*), in the form of its hemihydrate, M.P. (tube) 228°–230° C. $[\alpha]_D^{24°} = +74.7°$ (concentration 1% in chloroform). It is believed that the two ξ orientations are 3α-amino and 5βH.

The ether mother liquors obtained after isolating the above hemihydrate, are evaporated to dryness in vacuo, and the residue taken up in absolute alcohol. Treatment with concentrated hydrochloric acid gives the hydrochlorides of the amines present. The mixture is filtered and the crude hydrochloride triturated with absolute alcohol. This affords 3 g. of salt sparingly soluble in ethanol, which is recrystallised from methyl alcohol. There is thus obtained the compound I*ai*, weight 135 g., M.P. (K): 265° C., $[\alpha]_D^{24.5°} = +65.8°$ (concentration: 1% in 95% alcohol).

EXAMPLE 31

3ξ-dimethylamino-17α,21-dihydroxy-5ξ - pregnane - 11,20-dione (I*ah*)

This is prepared according to the procedure of the procedure of the previous example, pyrrolidine being replaced by an alcoholic solution of dimethylamine. No basic product crystallises out directly, and the hydrochloride is directly precipitated from an alcohol solution of the crude amine. This hydrochloride is then recrystallised to constant M.P. (K)=265° C.

EXAMPLE 32

21-acetoxy-3ξ-amino-11β,17α-dihydroxy-5ε-pregnane-20-one (I*ap*) and its derivatives There are charged into an apparatus for hydrogenation at ordinary pressure, fitted with an electromagnetic stirrer which heats:

4 g. of hydrocortisone acetate (about 0.01 mol) 80 ml. of absolute alcohol, 1.2 g. of benzylamine and 0.4 g. of 5% palladium supported upon charcoal. The mixture is heated to 50° C. and hydrogenation allowed to proceed until 0.03 mol of hydrogen has been absorbed: this requires about 8 hours. The mixture is filtered, the residue washed with alcohol, 1.5 g. of benzaldehyde is added to the filtrate and the whole is then heated for 10 minutes under reflux. The alcohol is removed in vacuo, and the residue taken up in boiling cyclohexane to remove the excess of aldehyde. The resulting residue is washed with ether and recrystallised from methanol yield of 21-acetoxy-3ε-benzylidene imino-11β,17α-dihydroxy-5ξ-pregnane-20-one (I*aq*), M.P. (tube) 204°–205° C., $[\alpha]_D^{21.5°} = +79°$ (concentration 1% in chloroform).

Hydrogenation of the derivative I*aq* gives the free amine I*ap*, rather unstable and crystallisable with difficulty.

The invention is not limited to the examples the purpose of which is to illustrate and emphasise the great variety of 3-keto steroids and amines which can be used.

Thus treatment of 6.3 g. of 5β-pregnane-3,20-dione (II*c*) with ammonia and hydrogen under conditions precisely the same as those used with ketone II*b* (Example 22, paragraph (b)) gives after recrystallisation from ethyl acetate, 0.5 g. of 3β-benzylidene amino-5β-pregnane-20-one (I*s*) M.P. (tube) 189°–193° C. There is no depression of melting point on carrying out a mixed melting point determination with an authentic specimen prepared as described in paragraph (a) of Example 21.

In the same way 3β-dimethylamino-5β-pregnane-20-one, or methyl-dihydrohalophylline (Janot and coworkers, Bull. Soc. Chim. France, 1959, page 896) M.P. 56° C. (tube), has been prepared by the catalytic reductive amination of 5α-pregnane-3,20-dione (II*b*) and dimethylamine. The fumarate of the base recrystallised from acetone has M.P. 159°–161° C. (tube), $[\alpha]_D^{25.5°} = +65.9°$ (concentration = 0.8% in methanol).

We claim:
1. A process for the production of 3-aminosteroids having the general formula

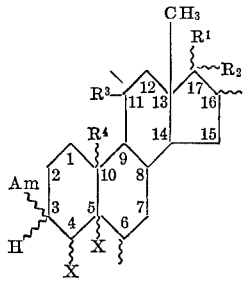

in which R¹ is selected from the group consisting of —OR⁶ and —CR⁷—CH₂—R⁸, R⁶ being selected from the group consisting of hydrogen atoms and acyl groups derived from monocarboxylic saturated aliphatic acids having less than six carbon atoms, R⁷ being selected from the group consisting of =O and

and R⁸ being selected from the group consisting of hydrogen atoms and groups having the formula —OR⁶;

R² is selected from the group consisting of hydrogen atoms and —OR⁶, not more than one of R¹ and R² being the group —OR⁶;

R³ is selected from the group consisting of H₂,

and =O;

R⁴ is selected from the group consisting of hydrogen atoms and methyl groups;

X is selected from the group consisting of hydrogen atoms at positions 4 and 5 and together an olefinic linkage between positions 4 and 5;

Am is selected from the group consisting of (a) primary amino groups, (b) amino groups containing at least one substituent selected from the group consisting of aliphatic groups having less than six carbon atoms, phenylalkyl groups having less than six carbon atoms in the alkyl portion thereof, and saturated heterocyclic groups selected from the class consisting of pyrrolindo, piperidino, morpholino, piperazino and N'-lower alkyl piperazino groups, (c) acetylamido group, and (d) imino groups having the general formula —N=CH—Ar in which Ar is selected from the class consisting of phenyl and p-methoxy phenyl, which process comprises treating a ketone having the general formula

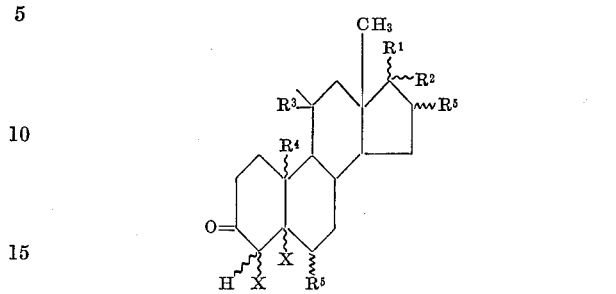

in which R¹, R², R³, R⁴ and R⁵ are defined as above, and X is selected from the group consisting of hydrogen atoms at positions 4 and 5 and together an olefinic linkage between positions 4 and 5, with a monoamine having the general formula AmH, in which Am is as above defined, and with hydrogen in the presence of a hydrogenating catalyst.

2. A process for the production of 3-aminosteroids, which comprises treating a ketone having the general formula

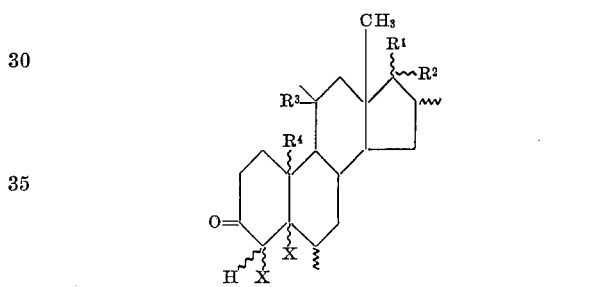

in which R¹ is selected from the group consisting of —OR⁶ and —CR⁷—CH₂—R⁸, R⁶ being selected from the group consisting of hydrogen atoms and acyl groups derived from monocarboxylic saturated aliphatic acids having less than six carbon atoms, R⁷ being selected from the group consisting of =O and

and R⁸ being selected from the group consisting of hydrogen atoms and groups having the formula —OR⁶;

R² is selected from the group consisting of hydrogen atoms and —OR⁶, not more than one of R¹ and R² being the group —OR⁶;

R³ is selected from the group consisting of H₂, and =O;

R⁴ is selected from the group consisting of hydrogen atoms and methyl groups;

X is selected from the group consisting of hydrogen atoms at positions 4 and 5 and together an olefinic linkage between positions 4 and 5, with formic acid and with a monoamine having the general formula AmH in which AM is selected from the group consisting of (a) primary amino groups, (b) amino groups containing at least one substituent selected from the group consisting of aliphatic groups having less than six carbon atoms, phenylalkyl groups having less than six carbon atoms in the alkyl portion thereof, and saturated heterocyclic groups selected from the class consisting of pyrrolidino, piperidino, morpholino, piperazino and N'-lower alkyl piperazino groups, (c) acetylamido group, and (d) imino groups having the general formula —N=CH—Ar, in which Ar is selected from the class consisting of phenyl and p-methoxy phenyl.

3. The process of claim 2, the X's together defining an olefinic linkage between positions 4 and 5 and R¹ representing —CO—CH₂—R⁸, said ketone being reacted firstly with said monoamine, and subsequently with formic acid.

4. A process as claimed in claim 1 in which the amine employed is a secondary amine.

5. A process as claimed in claim 2 in which the amine employed is a secondary amine.

6. A process as claimed in claim 1 in which benzylamine is used and the hydrogenation is continued to effect hydrogenolysis of the secondary amine initially produced thereby to produce a steroid having a primary amino group in the 3-position.

7. 3β-amino-5β-pregnane-20-one.
8. 3β-amine-21-acetoxy-5β-pregnane-20-one.
9. 3α-pyrrolidinyl-5β-pregnane-20-one.
10. 3β-pyrrolidinyl-5α-pregnane-20-one.
11. 3α-pyrrolidinyl-5β-pregnane-20β-ol.
12. 3β-pyrrolidinyl-5β-pregnane-20β,21-diol.
13. 3α-piperidinyl-5β-pregnane-20β,21-diol.
14. 3α-pyrrolidinyl-5β-pregnane-20β,21-diol.
15. 3α-pyrrolidinyl-21-hydroxy-5β-pregnane-20-one.
16. 3β-benzylidenamino-21-acetoxy-5β-pregnane-20-one.
17. A compound of the formula:

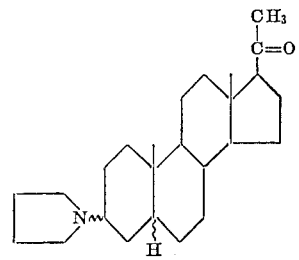

References Cited

UNITED STATES PATENTS 2,884,416   4/1959   Babcock _____ 260—239.5
2,919,285   12/1959  Pappo _____ 260—397.3

HENRY A. FRENCH, *Primary Examiner.*

U.S. Cl. X.R.

260—239.55, 397.3, 397.4, 397.45, 397.47, 397.5; 424—240

UNITED STATES PATENT OFFICE
CERTIFICATE OF CORRECTION

Patent No. 3,424,747

January 28, 1969

Josef Schmitt et al.

It is certified that error appears in the above identified patent and that said Letters Patent are hereby corrected as shown below:

In the heading to the printed specification, after line 9, insert -- ; June 17, 1960, 830,360; June 17, 1960, 830,361 --.

Signed and sealed this 14th day of April 1970.

(SEAL)
Attest:

Edward M. Fletcher, Jr.
Attesting Officer

WILLIAM E. SCHUYLER, JR.
Commissioner of Patents